US010567143B2

(12) United States Patent
Son

(10) Patent No.: US 10,567,143 B2
(45) Date of Patent: Feb. 18, 2020

(54) METHOD AND APPARATUS TO RECEIVE AND TRANSMIT DATA IN A MOBILE COMMUNICATION SYSTEM

(71) Applicant: Yeongmoon Son, Yongin-si (KR)

(72) Inventor: Yeongmoon Son, Yongin-si (KR)

( * ) Notice: Subject to any disclaimer, the term of this patent is extended or adjusted under 35 U.S.C. 154(b) by 0 days.

(21) Appl. No.: 16/142,459

(22) Filed: Sep. 26, 2018

(65) Prior Publication Data

US 2019/0199503 A1 Jun. 27, 2019

Related U.S. Application Data

(60) Provisional application No. 62/564,243, filed on Sep. 27, 2017.

(51) Int. Cl.
| | | |
|---|---|---|
| *H04W 76/28* | (2018.01) | |
| *H04L 5/00* | (2006.01) | |
| *H04W 76/27* | (2018.01) | |
| *H04W 80/02* | (2009.01) | |
| *H04W 72/04* | (2009.01) | |
| *H04W 72/14* | (2009.01) | |
| *H04W 80/08* | (2009.01) | |
| *H04L 1/18* | (2006.01) | |

(52) U.S. Cl.
CPC .......... *H04L 5/0094* (2013.01); *H04L 1/1819* (2013.01); *H04W 72/0446* (2013.01); *H04W 72/14* (2013.01); *H04W 76/27* (2018.02); *H04W 76/28* (2018.02); *H04W 80/02* (2013.01); *H04W 80/08* (2013.01)

(58) Field of Classification Search
None
See application file for complete search history.

(56) References Cited

U.S. PATENT DOCUMENTS

| 10,420,165 | B2 * | 9/2019 | Dinan | H04W 52/0225 |
|---|---|---|---|---|
| 2015/0327324 | A1 * | 11/2015 | Wei | H04W 52/0235 370/280 |
| 2016/0044605 | A1 * | 2/2016 | Vajapeyam | H04W 52/322 370/311 |
| 2016/0135247 | A1 * | 5/2016 | Ozturk | H04W 52/0212 455/436 |
| 2017/0171907 | A1 * | 6/2017 | Agarwal | H04W 52/0216 |
| 2018/0139772 | A1 * | 5/2018 | Ozturk | H04W 52/0225 |
| 2018/0262937 | A1 * | 9/2018 | Lee | H04B 17/309 |
| 2018/0332608 | A1 * | 11/2018 | Guo | H04W 72/1289 |

\* cited by examiner

*Primary Examiner* — Edan Orgad
*Assistant Examiner* — Emmanuel K Maglo
(74) *Attorney, Agent, or Firm* — Novick Kim & Lee, PLLC; Sang Ho Lee

(57) ABSTRACT

Data transfer method and apparatus for use in a mobile communication system are provided. Method to perform discontinuous reception includes receiving DRX configuration information from the base station, determining a specific subframe based on parameters included in the configuration information, determining a specific point of time within the subframe based on a parameter included in the configuration information, starting onDurationTimer at the determined point of time of the determined subframe and monitoring PDCCH when the onDurationTimer is running.

20 Claims, 17 Drawing Sheets

METHOD AND APPARATUS TO RECEIVE AND TRANSMIT DATA IN A MOBILE COMMUNICATION SYSTEM

CROSS-REFERENCE TO RELATED APPLICATION

This application claims the priority to U.S. Provisional Patent Application No. 62/564,243, filed Sep. 27, 2017, the disclosure of which is incorporated herein by reference.

BACKGROUND OF THE INVENTION

1. Field of the Invention

The present disclosure relates to a mobile communication system with multiple subcarrier spacings. More specifically, the present disclosure relates to a data transfer method and an apparatus for use in the mobile communication system with multiple subcarrier spacings.

2. Description of the Related Art

Mobile communication systems were developed to provide mobile users with communication services. With rapid technological advancements, the mobile communication systems have evolved to the level capable of providing high speed data communication service fulfilling various QoS requirements.

In the mobile communication system called NR (Next Radio) which is being developed, to support various QoS requirement in various deployment scenarios, multiple subcarrier spacing is needed to be supported in a given serving cell, a given frequency or a given frequency band.

OFDM based mobile communication systems so far use only a single subcarrier spacing and NR is the first mobile communication system using multiple subcarrier spacings.

Therefore, a need exists for a method and an apparatus for facilitating efficient data transfer in OFDM based mobile communication system with multiple subcarrier spacings.

SUMMARY

Aspects of the present disclosure are to address at least the above mentioned problems. Accordingly, an aspect of the present disclosure is to provide a method and an apparatus for facilitating data transfer in OFDM based mobile communication system with multiple subcarrier spacings.

In accordance with an aspect of the present disclosure, a data transfer method of a terminal in mobile communication system with multiple subcarrier spacings is provided. In the method, terminal performs discontinuous reception based on the parameters configured by a base station. More specifically, terminal receives DRX configuration information from the base station, determines a specific subframe based on parameters included in the configuration information, determines a specific point of time within the subframe based on a parameter included in the configuration information, starts onDurationTimer at the determined point of time of the determined subframe and monitors PDCCH when the onDurationTimer is running.

DETAILED DESCRIPTION

Figure 1:
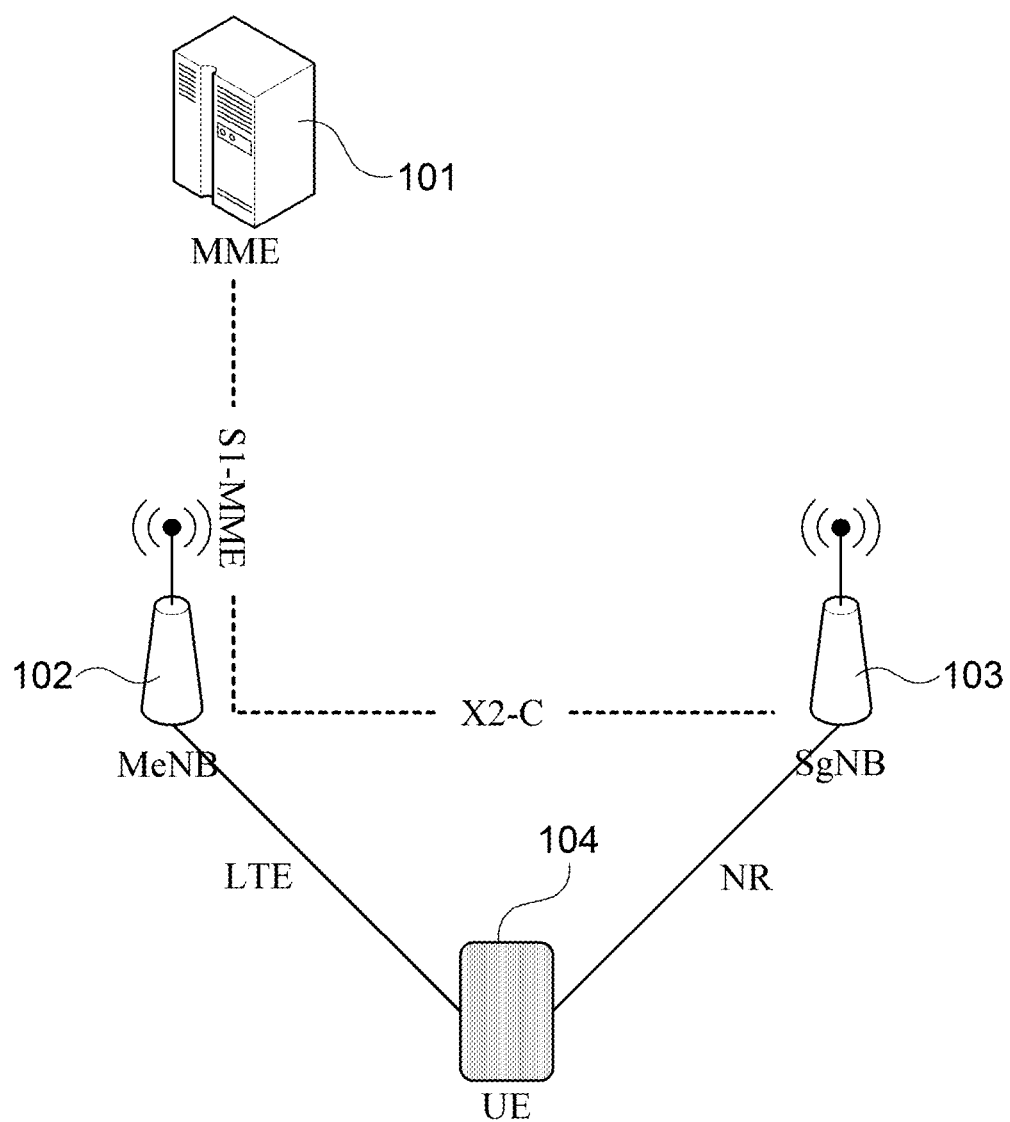
FIG. 1 is a diagram illustrating a mobile communication system architecture according to various embodiments of the present disclosure.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

The following description with reference to the accompanying drawings is provided to assist in a comprehensive understanding of various embodiments of the present disclosures as defined by the claims and their equivalents.

Terminologies used in the disclosures are explained below. Numerology defines a specific time duration e.g. the length of an OFDM symbol. Numerology and subcarrier spacing (hereafter SCS) have one to one relationship. In LTE, SCS is 15 KHz and the length of an OFDM symbol is 1/14 ms. In NR, SCS is either 15 KHz, 30 KHz, 60 KHz, 120 KHz or 240 KHz. The length of an OFDM symbol is inverse proportional to SCS. SCS, numerology and symbol length are corresponding each other and interchangeable in the disclosures. Subframe is time unit with 1 ms duration. Time slot (or slot) is time unit consisting with N symbols. N is either 7 or 14. Frame structure has same meaning as duplex mode. FS1 is FDD and FS2 is TDD.

FIG. 1 is a diagram illustrating a mobile communication system architecture according to various embodiments of the present disclosure.

Referring to FIG. 1, MME (101) is connected to MeNB (102) via S1 interface. SgNB(103) is connected to MeNB (102) via X2 interface. UE is connected to MeNB (102) and SgNB(103) via a specific radio interface/RAT. UE transmit and receive data with MeNB via a group of cells. The RAT of those cells is LTE/E-UTRA. The group of cells used for communication with MeNB is the 1st cell group (or Master Cell Group). UE transmit and receive data with SgNB via another group of cells. The RAT of those cells is NR. The group of cells used for communication with SgNB is the 2nd cell group (or Secondary Cell Group).

Referring to FIG. 1, base station is illustrated as a single node. In the real implementation, base station can be comprised of plurality of nodes. For example, a central unit and plurality of distributed unit can be comprised of a single base station and plurality of cells controlled by the base station.

Figure 2:
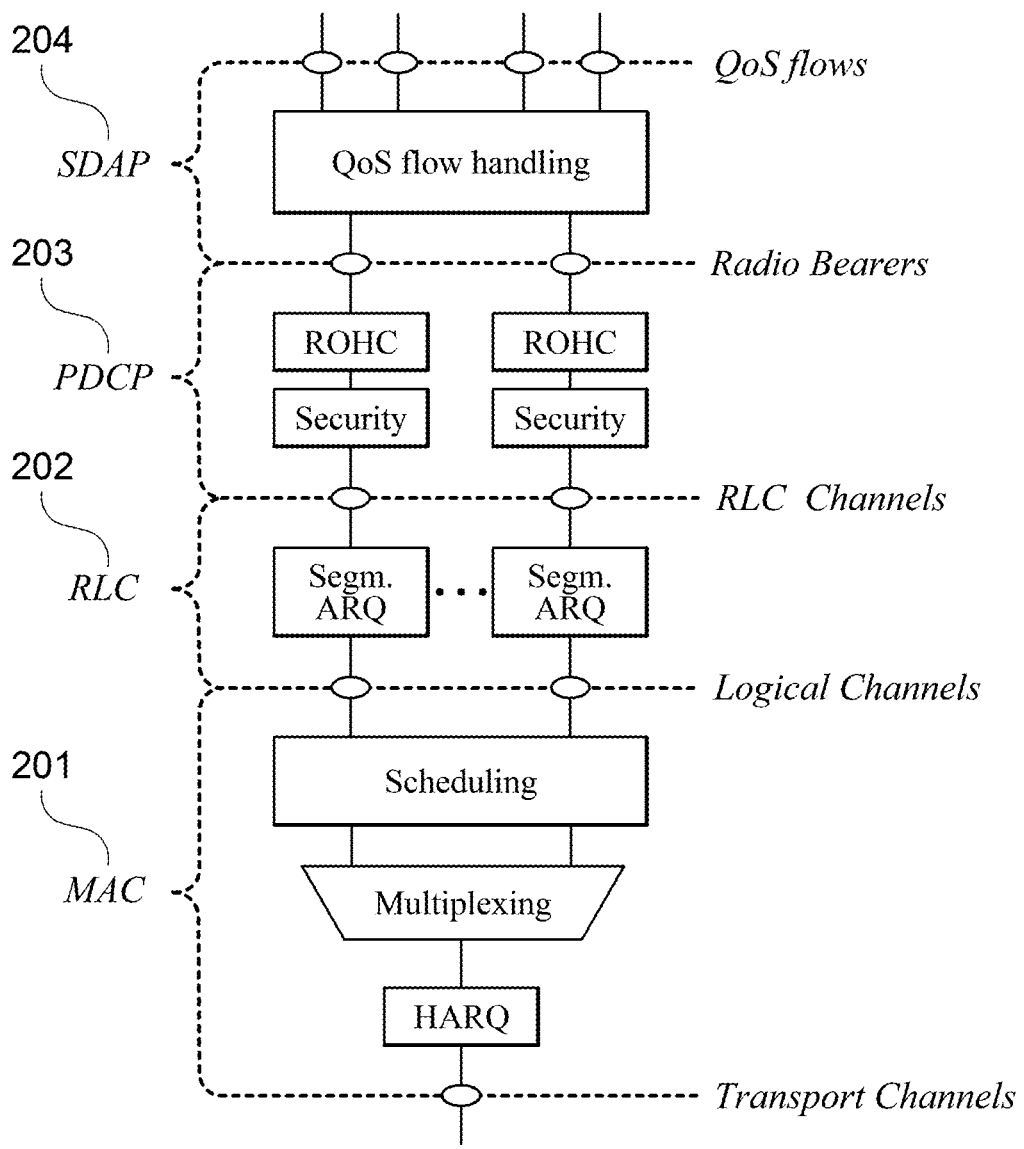
FIG. 2 is a diagram illustrating a protocol stack of a mobile communication system according to various embodiments of the present disclosure.

FIG. 2 is a diagram illustrating a protocol stack of a mobile communication system according to various embodiments of the present disclosure;

Referring to FIG. 2, Protocol stack of UE and base station is comprised of MAC (201), RLC (202), PDCP (203), SDAP (204). Multiple QoS flows/IP packet flows input to SDAP which distribute the IP packet to the appropriate PDCP. The RRC control message between UE and base station is exchanged via SRB (Signaling Radio Bearer). User data/IP packet between UE and base station is exchanged via DRB (Data Radio Bearer). Radio bearer is comprised of PDCP and RLC.

SDAP (Service Data Adaptation Protocol) layer handles QoS per data/service. More specifically, SDAP distribute IP packet received from the upper layer to the appropriate DRB. SDAP inspects SDAP header of the received SDAP PDU to apply reflective QoS. More details on reflective QoS can be found in TS 38.300.

PDCP (Packet Data Convergence Protocol) layer performs header compression/decompression, ciphering/deciphering and integrity protection. PDCP provides temporary lossless data transfer for the case where RLC cannot guarantee lossless data transfer.

RLC (Radio Link Control) layer process the RLC SDU received from PDCP to make the RLC PDU and submit it to the MAC layer. RLC layer performs ARQ (Automatic Retransmission Request) for RLC SDUs to ensure lossless data transfer.

MAC (Medium Access Control) layer multiplexes RLC PDUs, generated by multiple radio bearers configured in the UE, into MAC PDU and submit it to the physical layer. MAC layer demultiplexes RLC PDUs from MAC PDU and forward them to appropriate RLC entity. MAC performs specific operations required for data transfer with base station like random access or uplink timing adjustment.

1$^{st}$ Embodiment

The 1$^{st}$ embodiment is about DRX operation in a system with multiple numerologies. In such system, the number of symbols and of slots per given time period is different numerology by numerology. It makes DRX operation difficult because, if UE and GNB have a base of its DRX operation in different numerologies, DRX operation is not synchronized with each other.

Figure 3:
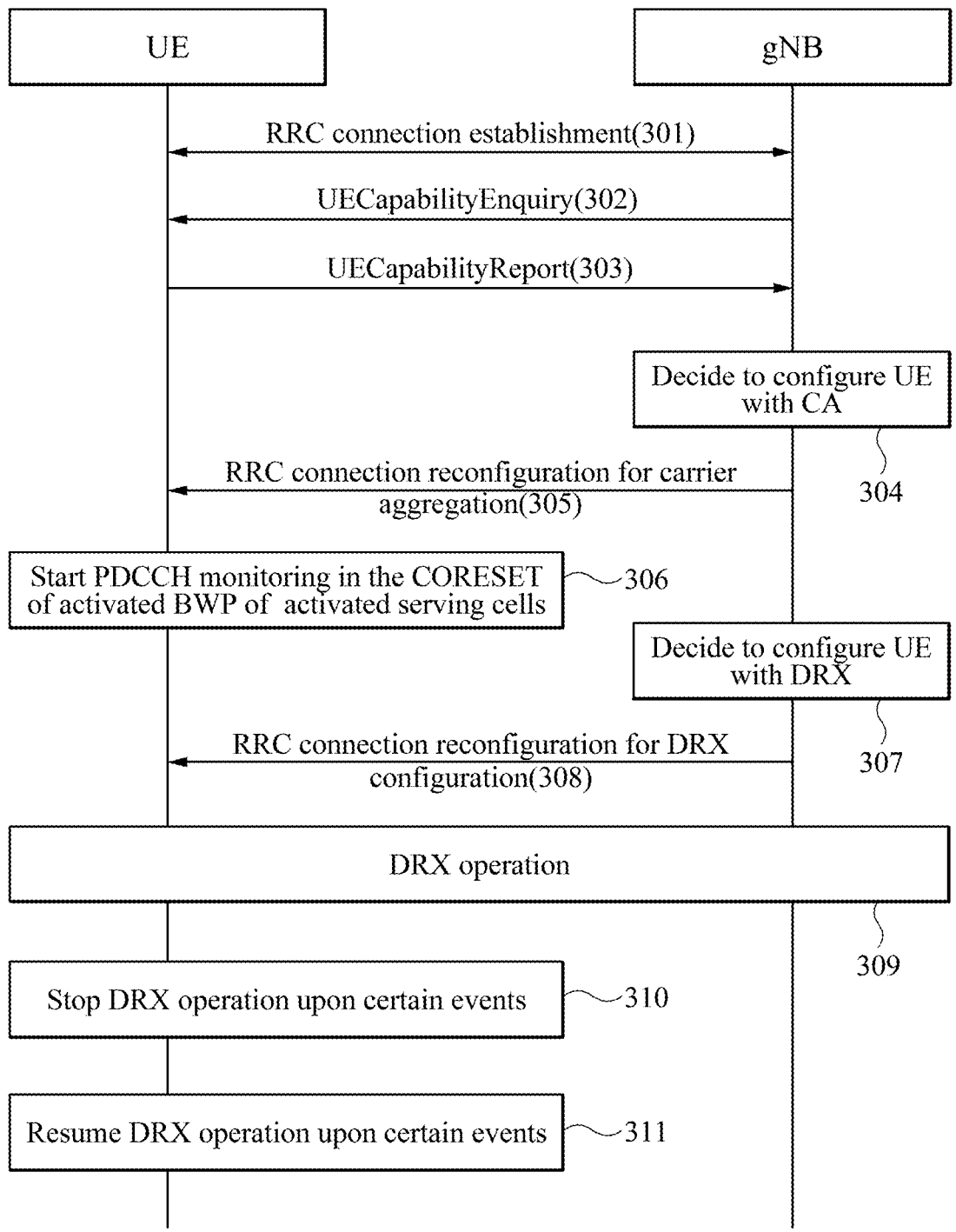
FIG. 3 is a signal flow diagram illustrating a procedure for transmitting and receiving signals at a UE and base station in a mobile communication system according to the 1st embodiment of the present disclosure.

FIG. 3 is a signal flow diagram illustrating a procedure for transmitting and receiving signals at a UE and base station in a mobile communication system according to the $1^{st}$ embodiment of the present disclosure.

UE and GNB establish the RRC connection wherein SRB 1 is established 301.

GNB instructs UE to report its capability by sending UECapabilityEnquiry message 302. In the message, GNB indicates for which NR frequency band UE shall reports corresponding capability preferentially. For example, if GNB instruct UE to report its capability for NR band x, y and z preferentially, UE reports those NR bands and band combinations of those bands preferentially in the response message (e.g. if UE supports NR band x, y, w, v, then UE reports band combination from band x and y preferentially).

UE reports its capability by sending UECapabilityInformation message(UECapabilityReport) 303. In the message UE reports the highest/largest SCS/numerology for each NR frequency band it supports. UE supports lower/smaller SCS/numerology than reported highest/largest SCS/numerology for each NR frequency band. For example, if UE reports that it supports 60 KHz SCS as the largest SCS for a certain NR band, UE also supports 15 KHz and 30 KHz SCS for the NR band.

GNB decides to configure the UE with CA (carrier aggregation) 304. Based on the UE capability and expected Downlink and Uplink data rate for the UE, GNB decides which carrier and which numerology should be applied to the UE.

A single numerology is applied to a set of consecutive PRBs called BWP (Bandwidth part) and multiple BWPs can be configured in a serving cell. At least one CORESET (Control Resource Set) is configured for each BWP. CORESET is the time/frequency pattern where PDCCH (Physical Downlink Control Channel) for a specific UE is transmitted/received.

Figure 4:
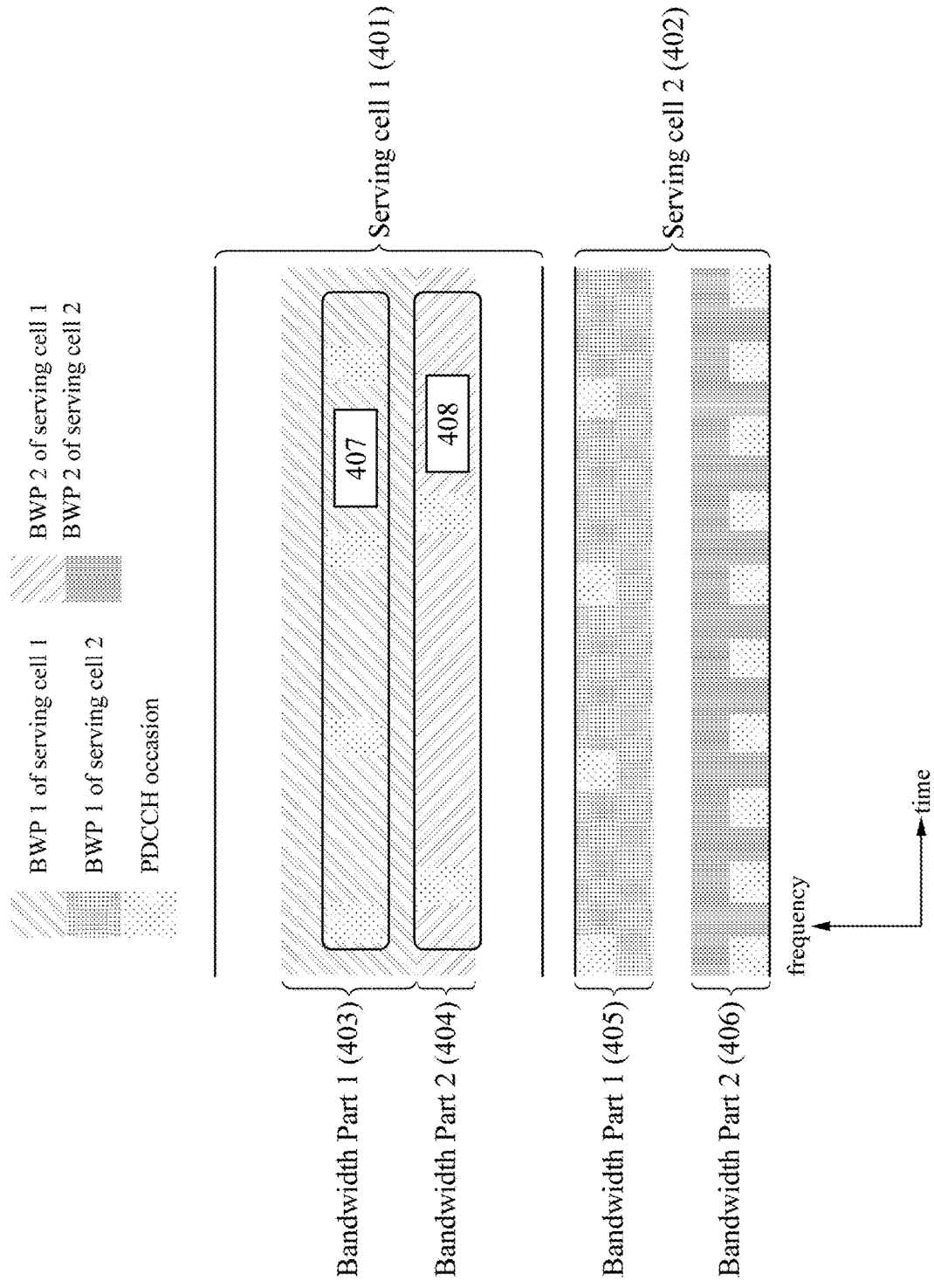
FIG. 4 is a diagram illustrating BWP in a mobile communication system.

For example, as shown in FIG. 4, for a UE, a serving cell 1 401 is configured with BWP 1 403 and BWP 2 404; a serving cell 2 402 is configured with BWP 1 405 and BWP 2 406.

The bandwidth of each BWP (the number of consecutive PRBs) can be different. CORESET of each BWP is configured within the frequency resource of the corresponding BWP. The bandwidth of CORESET can be equal to or smaller than the bandwidth of corresponding BWP. For example, the bandwidth of BWP 1's CORESET 407 is smaller than the bandwidth of BWP1 403, while the bandwidth of BWP 2's CORESET 408 is equal to the bandwidth of BWP2 404.

CORESET is the set of PDCCH occasions where the corresponding UE can be scheduled. The time pattern of PDCCH occasions of a CORESET is signaled with the start offset and periodicity. The start offset in terms of number of symbols is the offset between the boundary of a certain subframe/slot and the first symbol of the PDCCH occasion of the CORESET. The periodicity can be either number of symbols, number of slots or number of subframes. The periodicity defines the distance between two consecutive PDCCH occasions.

Referring to FIG. 3, GNB transmits and UE receives RRC connection reconfiguration message including SCell configuration information 305. The SCell configuration information includes SCell identity, ARFCN of the SCell and the bandwidth of the SCell. It also includes the information about the BWPs configured for the SCell.

In carrier aggregation operation, UE is configured with PCell (Primary Cell) and one or more SCells (Secondary Cells). PCell is the serving cell where UE has established RRC connection or UE has handed over to. Serving cell other than PCell are SCell. PCell is always activated while SCell is activated or deactivated via Activation/Deactivation MAC CE (MAC Control Element). Multiple BWPs can be configured for a serving cell but only part of them can be activated simultaneously. UE monitors PDCCH in CORESET of only activated BWPs of activated serving cells.

UE start to monitor PDCCH/DCI in CORESET of each activated BWP of each serving cells and if scheduled, receive/transmit PDSCH/PUSCH in the corresponding BWP of the corresponding serving cell where UE is scheduled 306.

GNB decides to configure UE with DRX. GNB determines the DRX-configuration and transmits RRC connection reconfiguration message including DRX-configuration 307. In the DRX configuration, GNB indicates that one of configured BWPs is the DRX reference BWP. The indication can be e.g. the identify of BWP of PCell. If such indication does not exist, UE assumes a certain BWP as the DRX reference BWP. The BWP can be activated BWP of the PCell, BWP of PCell where UE has performed random access procedure for RRC connection establishment or handover (e.g. initial access BWP) or default BWP of PCell.

UE receives the RRC connection reconfiguration message including DRX configuration 308. UE starts DRX operation when the RRC connection reconfiguration message is successfully received and GNB starts DRX operation when the transmission of RRC connection reconfiguration message is started.

UE and GNB performs DRX operation 309. UE monitors PDCCH during Active Time in CORESET of active BWP of active serving cell. GNB schedules UE during Active Time in CORESET of active BWP of active serving cell.

When a DRX cycle is configured, the Active Time includes the time while drx-onDurationTimer or drx-InactivityTimer or drx-RetransmissionTimerDL or drx-RetransmissionTimerUL is running.

UE stops DRX operation (e.g. UE starts monitoring PDCCH even during the time period which would have been in non-Active Time) when $1^{st}$ event occur 310. The $1^{st}$ event include RLF, Beam failure, Beam recovery procedure, state transition from RRC CONNECTED to RRC INACTIVE state. RRC INACTIVE state and RRC CONNECTED state are defined in TS 38.300 and TS 38.331.

UE resumes DRX operation when $2^{nd}$ event occurs 311. $2^{nd}$ event includes state transition from RRC INACTIVE to RRC CONNECTED state, the completion of beam recovery procedure.

Figure 5:
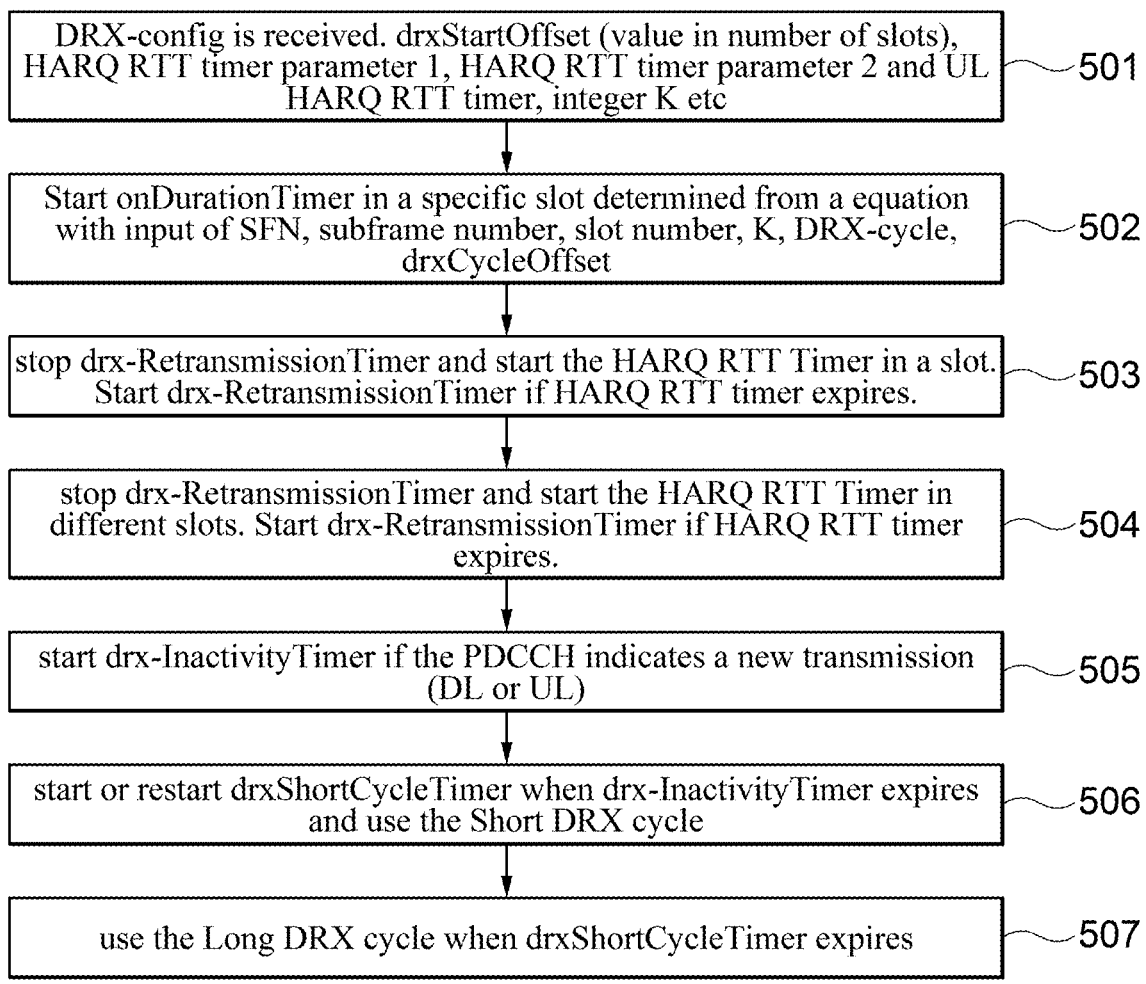
FIG. 5 is the block diagram illustrating the DRX operation of a UE wherein an equation is used to identify the slot when onDurationTimer start.

FIG. 5 is the block diagram illustrating the DRX operation of a UE wherein an equation is used to identify the point of time when onDurationTimer start.

DRX-config is received from GNB 501. DRX-config is included in rrcConnectionReconfiguration message.

DRX-config includes the values for various timers like onDurationTimer, drx-InactivityTimer, drx-Retranmsission-Timer, drx-ULRetransmissionTimer, UL HARQ RTT timer and drxShortCycleTimer.

DRX-config includes values for longDRX-Cycle and shortDRX-Cycle (e.g. as a $1^{st}$ DRX parameter) that are the periodicity of onDurationTimer.

The unit of onDurationTimer, drx-InactivityTimer, longDRX-Cycle and shortDRX-Cycle is msec or number of subframes.

The unit of drx-RetranmsissionTimer and drx-ULRetransmissionTimer is number of slots of the serving cell or of BWP where retransmission occurs.

DRX-config includes values for drxStartOffset (e.g. as a $2^{nd}$ DRX parameter).

The unit of drxStartOffset is number of slots of the PCell (or reference frequency part of PCell).

DRX-config includes values for HARQ RTT timer parameter 1 and HARQ RTT timer parameter 2.

HARQ RTT timer parameter 1 and HARQ RTT timer parameter 2 are used to determine the point of time when drx-RetranmsissionTimer starts. The unit of HARQ RTT timer parameter 1 is the slot or symbol of the PCell (or reference frequency part of PCell where PUCCH or HARQ ACK/NACK is transmitted). The unit of HARQ RTT timer parameter 2 is number of slots of the corresponding serving cell where transmission or retransmission occurs (or where PDCCH for transmission or retransmission is received).

UL HARQ RTT timer is used to determine the point of time when drx-ULRetransmissionTimer starts. The unit of UL HARQ RTT timer is number of slots of the serving cell or BWP where transmission or retransmission occurs (or where PDCCH for transmission or retransmission is received).

DRX-config includes numerological specific integer K. Alternatively K can be deduced from the numerology and the number of symbols of a slot of PCell (or reference frequency part of PCell).

UE starts onDurationTimer 502 when

[(SFN*10*$K$)+subframe number*$K$+slot number] modulo(shortDRX-Cycle*$K$)=(drxStartOffset) modulo(shortDRX-Cycle*$K$) if the Short DRX Cycle is used; or

[(SFN*10*$K$)+subframe number*$K$+slot number] modulo(longDRX-Cycle*$K$)=drxStartOffset if the Long DRX Cycle is used UE starts or stops HARQ RTT timer and drx-RetransmissionTimer 503. UE stops drx-RetransmissionTimer and start the HARQ RTT Timer for the corresponding HARQ process in a slot if the PDCCH indicates a DL assignment for this slot. UE starts drx-RetransmissionTimer when the HARQ RTT timer expires.

The length of HARQ RTT timer is the sum of a and b. If K1 is signalled in the PDCCH, K1 is used as a. Otherwise HARQ parameter 1 is used as a. HARQ parameter 2 is used as b. HARQ RTT timer expires after a slots in PCell and after b slots in the corresponding serving cell. K1 is the distance between PDSCH reception and corresponding HARQ ACK/NACK transmission and can be indicated in the PDCCH scheduling the PDSCH.

UE starts or stops UL HARQ RTT timer and drx-ULRetransmissionTimer 504. UE stop drx-ULRetransmissionTimer in a $1^{st}$ slot and start UL HARQ RTT timer for the corresponding HARQ process in a $2^{nd}$ slot. The $1^{st}$ slot is the slot on which PDCCH indicating UL transmission is received and the $2^{nd}$ slot is the slot on which corresponding PUSCH transmission occurs. UE starts drx-ULRetransmissionTimer when UL HARQ RTT timer expires.

UE starts drx-InactivityTimer if the PDCCH indicates a new transmission (for Downlink or Uplink) 505.

UE starts or restarts drxShortCycleTimer when drx-InactivityTimer expires and use the Short DRX cycle 506.

UE uses the Long DRX cycle when drxShortCycleTimer expires 507.

Figure 6:
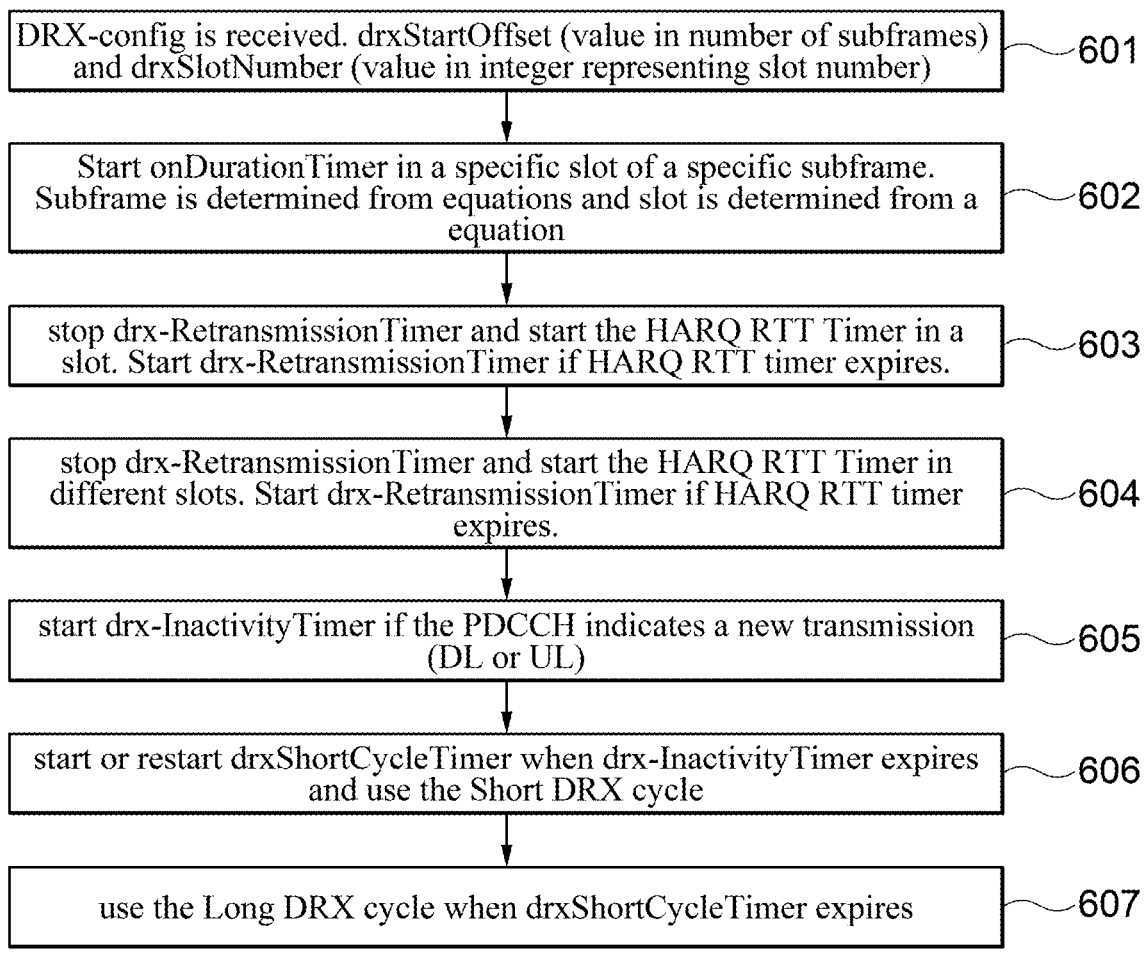
FIG. 6 is the block diagram illustrating the DRX operation of a UE wherein two equations are used to identify the slot when onDurationTimer starts.

FIG. 6 is the block diagram for the UE operation on DRX wherein the $1^{st}$ equation is used to identify the subframe and the $2^{nd}$ equation is used to identify the slot when onDurationTimer start.

The first equation is used to determine the subframe and the second equation is used to determine the slot within the determined subframe.

DRX-config is received from GNB 601. DRX-config is included in rrcConnectionReconfiguration message. DRX-config includes the same information as in 501. The unit of the timers and parameters are same as 501 except the drxStartOffset. The unit of drxStartOffset is number of subframes.

In addition, drxStartSlotNumber is included in the DRX-config (e.g. as a $3^{rd}$ DRX parameter). The drxStartSlotNumber is slot number of the PCell (or reference frequency part of PCell).

UE starts onDurationTimer on a specific slot of a specific subframe 602. The specific subframe is determined from the following equations 1 or 2.

[(SFN*10)+subframe number]modulo(shortDRX-Cycle)=(drxStartOffset)modulo (shortDRX-Cycle)(if the Short DRX Cycle is used)     (1)

[(SFN*10)+subframe number]modulo(longDRX-Cycle)=drxStartOffset(if the Long DRX Cycle is used)     (2)

The specific slot is determined from the following equation 3.

slot number=drxSlotNumber mod $K$     (3)

Note that different equation is applied in determining the subframe depending on the DRX-cycle used while a single equation is applied in determining the slot regardles of the DRX-cycle used.

603~607 are same as 503~507.

Figure 7:
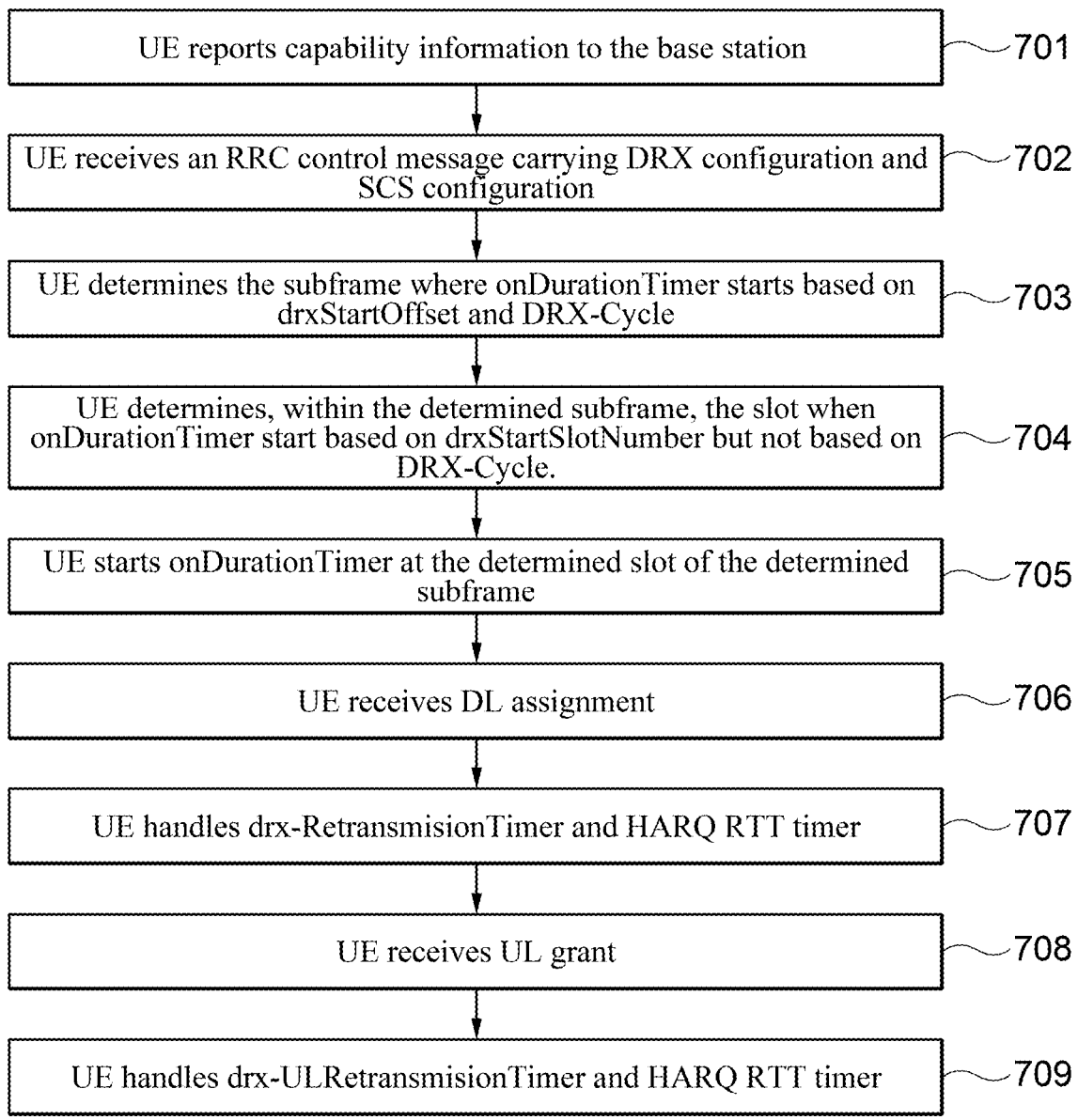
FIG. 7 is a flow chart illustrating DRX procedure of a UE according to the first embodiment of the present disclosure.

FIG. 7 is a flow chart illustrating DRX procedure of UE according to the first embodiment of the present disclosure.

UE reports capability information to the base station in response to capability information request sent by the base station 701.

UE capability information includes the information about supported SCS per supported frequency band.

UE receives an RRC control message carrying DRX configuration and SCS configuration 702.

SCS configuration information indicates the SCS to be applied to each of the configured BWP.

DRX configuration information includes following information; onDurationTimer in msec, drx-InactivityTimer in msec, drx-RetransmissionTimer in number of slots, HARQ RTT timer in number of symbols, drxStartOffset, drxStartSlotNumber.

The actual length of onDurationTimer and of drx-InactivityTimer are only determined by the signaled values and not affected by SCS. The actual length of drx-RetransmissionTimer and of HARQ RTT timer are determined by signaled values and SCS.

UE determines the subframe where onDurationTimer starts based on drxStartOffset and DRX-Cycle. DRX-Cycle is either longDRX-Cycle or shortDRX-Cycle 703.

UE determines, within the determined subframe, the slot when onDurationTimer start based on drxStartSlotNumber but not based on DRX-Cycle 704.

UE starts onDurationTimer at the determined slot of the determined subframe 705. Since the slots within a subframe is sequentially located in the subframe, starting onDurationTimer in a specific slot of a specific subframe is equivalent to starting onDurationTimer after certain amount of time from the starting boundary of the specific subframe. Hence, UE starts onDurationTimer after certain amount of time from the starting boundary of the determined subframe while the amount of time is determined by drxStartSlotNumber.

The length of onDurationTimer is determined by the value configured for onDurationTimer.

UE receives DL assignment 706.

If the drx-RetransmissionTimer is running, UE stops drx-RetransmissionTimer and starts HARQ RTT timer. And, UE starts or restarts drx-RetransmissionTimer when HARQ RTT timer expires 707. The length of HARQ RTT timer is determined by SCS and the value configured for HARQ RTT parameter 2. HARQ RTT timer expires after a specific number of symbols in the $1^{st}$ serving cell and after another specific number of symbols in $2^{nd}$ serving cell since the corresponding DL assignment is received. The length of drx-RetransmissionTimer is determined by SCS and by the value configured for drx-RetransmissionTimer.

UE receives UL grant 708.

If the drx-RetransmissionTimer is running, UE stops drx-ULRetransmissionTimer and starts HARQ RTT timer. And, UE starts or restarts drx-ULRetransmissionTimer when HARQ RTT timer expires 709. The length of HARQ RTT timer is determined by SCS and the value configured for UL HARQ RTT timer. The length of drx-ULRetransmissionTimer is determined by SCS and the value configured for drx-ULRetransmissionTimer. UE stops drx-ULRetransmissionTimer and starts HARQ RTT timer at different points of time.

Figure 8:
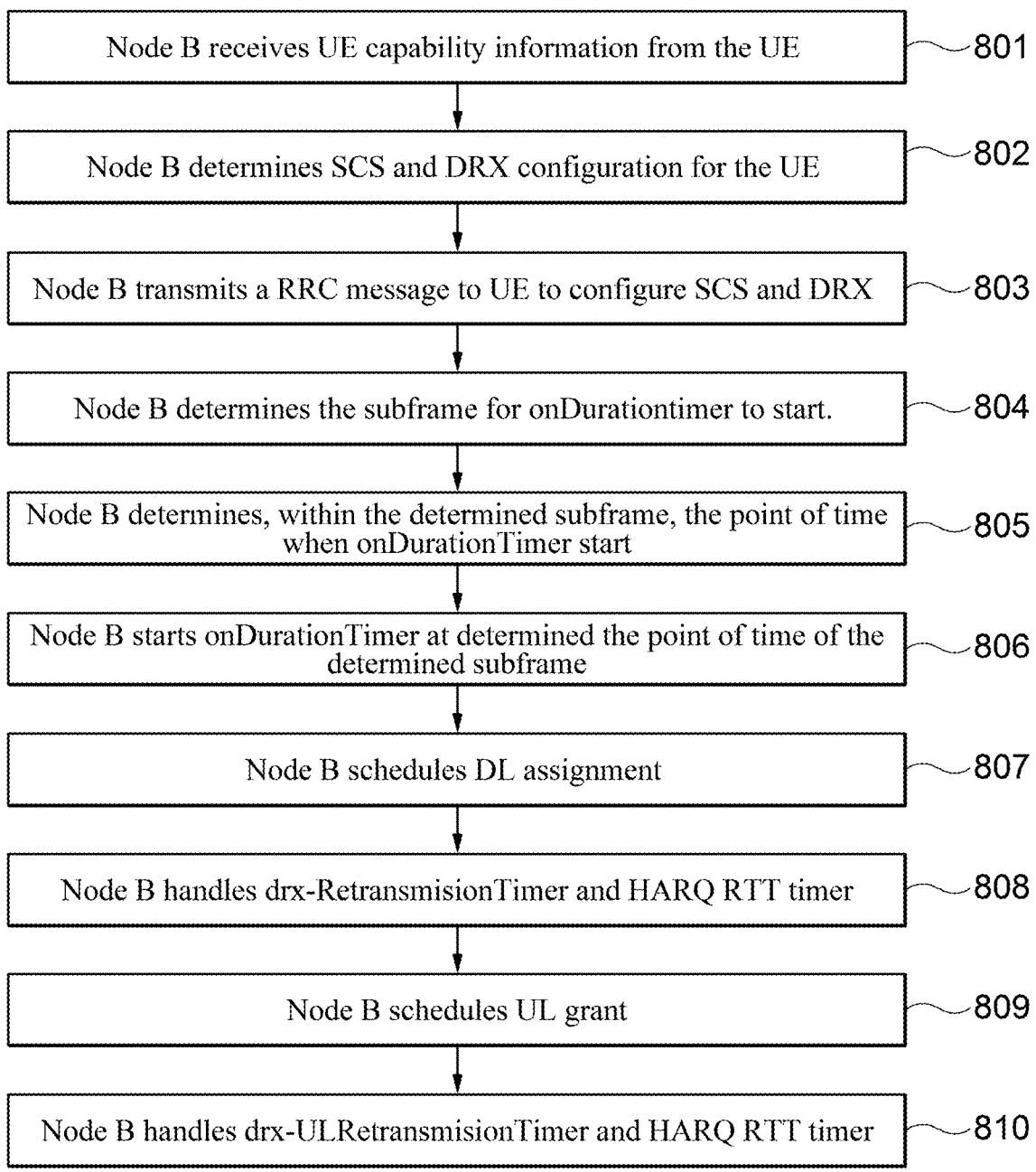
FIG. 8 is a flow chart illustrating DRX procedure of Node B according to the first embodiment of the present disclosure.

FIG. 8 is a flow chart illustrating DRX procedure of Node B according to the first embodiment of the present disclosure.

Node B receives UE capability information from the UE 801.

Node B determines SCS and DRX configuration for the UE based on UE capability 802.

Node B transmits an RRC message to UE to configure SCS and DRX 803.

Node B determines the subframe for onDurationtimer to start based on drxStartOffset and DRX-Cycle 804. DRX-Cycle is either longDRX-Cycle or shortDRX-Cycle.

Node B determines, within the determined subframe, the point of time when onDurationTimer start based on drxStartSlotNumber but not based on DRX-Cycle 805.

Node B starts onDurationTimer at determined the point of time of the determined subframe 806, and schedule UE when onDurationTimer is running.

Node B schedules DL assignment 807.

Node B stop drx-RetransmissionTimer if running, start HARQ RTT timer and start or restart drx-RetransmissionTimer when HARQ RTT timer expires 808. Node B schedule HARQ downlink retransmission when drx-RetransmissionTimer is running.

Node B schedules UL grant 809.

Node B stop drx-ULRetransmissionTimer if running, start HARQ RTT timer and start or restart drx-ULRetransmissionTimer when HARQ RTT timer expires 810. Node B schedule HARQ uplink retransmission when drx-ULRetransmissionTimer is running.

$2^{nd}$ Embodiment

To support traffic like VoIP where small packets with similar sizes are regularly generated, semi-persistent resources for the first HARQ transmissions can be allocated to UEs. SPS (Semi-Persistent Scheduling) is characterized as below.

RRC defines the periodicity of the semi-persistent downlink assignment/uplink grant and others like the number of HARQ processes etc;

PDCCH indicates whether the downlink assignment/the uplink grant is a semi-persistent one e.g. whether it can be implicitly reused in the following TTIs according to the periodicity defined by RRC.

When required, retransmissions are explicitly signaled via the PDCCH(s).

Figure 9:
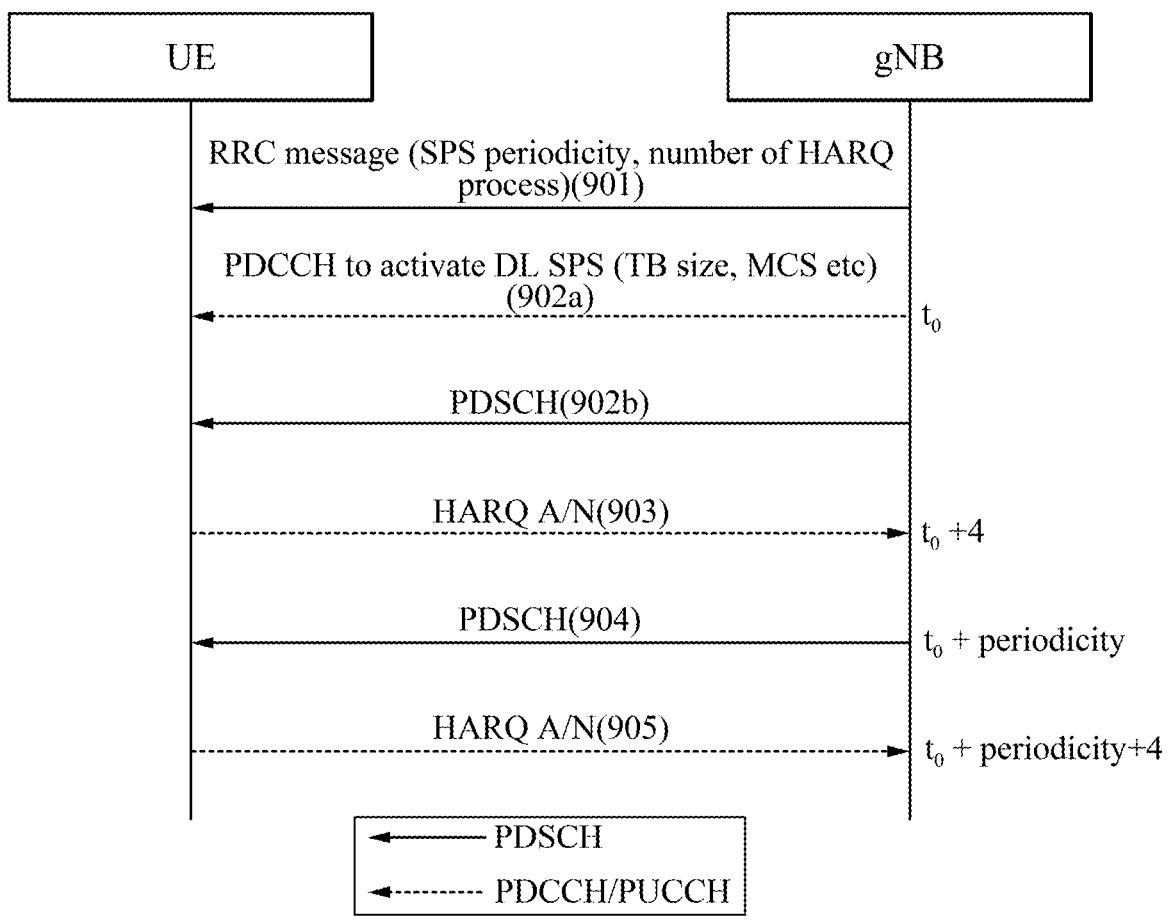
FIG. 9 is a diagram illustrating an example of the SPS operation.
Figure 10:
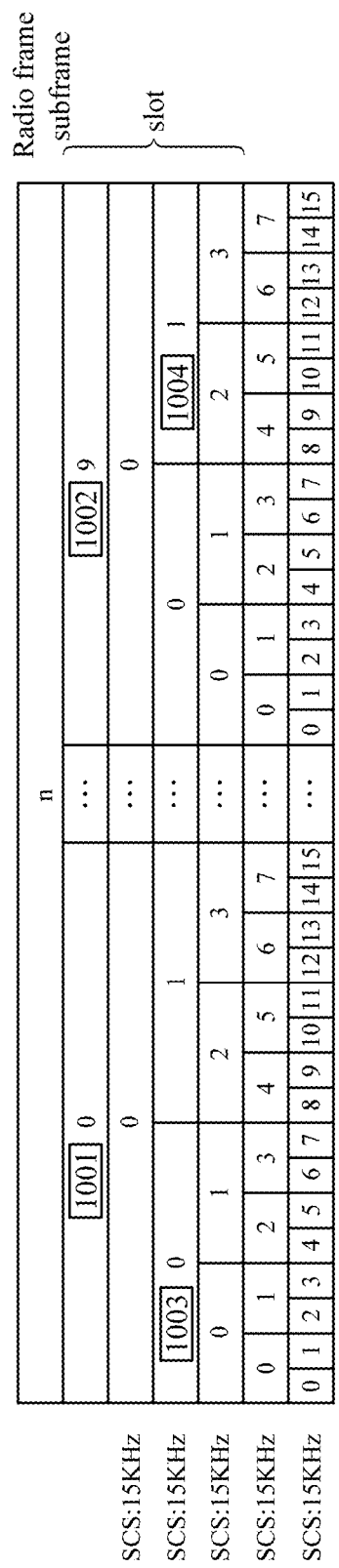
FIG. 10 is a diagram illustrating a structure of radio frame.

FIG. 9 is a diagram illustrating an example of the SPS operation.

GNB transmits an RRC message to configure DL SPS 901. The message includes SPS configuration information like SPS periodicity and the number of HARQ process.

GNB activates DL SPS by sending PDCCH indicating the TB (Transport Block) size, MCS (Modulation Coding Scheme), PRB (Physical Resource Block) and other information for DL SPS 902*a*. At the same time, GNB transmits corresponding PDSCH 902*b*.

UE transmit the HARQ ACK/NACK to the GNB, according to the decoding result of the PDSCH, after 4 subframes 903. If decoding fails, HARQ NACK is feedbacked and HARQ retransmission follows in asynchronous manner.

GNB transmits PDSCH without PDCCH after SPS periodicity according to the SPS scheduling information 904.

UE transmits the HARQ ACK/NACK to the GNB, according to the decoding result of the PDSCH, after 4 subframes 905.

The SPS operation continues until SPS resource is released by PDCCH.

As seen above, in the SPS operation, transmission resource and transport format (e.g. MCS, TB size) for initial transmission are signaled only once and the subsequent initial transmissions are performed accordingly without explicit signaling.

In NR system, multiple numerologies can be used in a single cell, or numerology can be differed cell by cell. The numerology corresponds to the length of a single OFDM symbol, which is in turn determined by SCS. Hereafter, numerology and SCS are used in interchangeable manner. Table below shows the length of slot for each SCS. Note that one slot consists of 7 OFDM symbols or 14 OFDM symbols. Only 14 OFDM symbols per slot is used in SCS of 60, 120 and 240 KHz. Either 7 or 14 OFDM symbols per slot is used in SCS of 15 KHz and 30 KHz. Table 1-1 shows the length of the slot in different SCSs. Only 14 symbols per slot is considered for simplicity.

TABLE 1-1

| SCS | 15 KHz | 30 KHz | 60 KHz | 120 KHz | 240 KHz |
|---|---|---|---|---|---|
| length of slot (m sec) | 1 | ½ | ¼ | ⅛ | 1/16 |

One radio frame consists of 10 subframes. The length of a radio frame is 10 m sec and the length of a subframe is 1 m sec. Hence the number of slots per subframe is differed SCS by SCS as in the table 1-2.

TABLE 1-2

| SCS | 15 KHz | 30 KHz | 60 KHz | 120 KHz | 240 KHz |
|---|---|---|---|---|---|
| number of slots per subframe | 1 | 2 | 4 | 8 | 16 |

A radio frame is associated with an SFN which is explicitly signaled in MIB. A subframe is associated with a subframe number which is implicitly determined by the location of the subframe in a given radio frame. For example, the first subframe of radio frame n is associated with subframe number 0 1001 and the last subframe of radio frame n is associated with subframe number 9 1002.

A slot is associated with a slot number which is implicitly determined by the location of the slot in a given subframe. For example, the first slot of subframe 0 in 30 KHz SCS is associated with slot number 0 1003 and the last slot of subframe 9 in 30 KHz SCS is associated with slot number 1 1004.

This invention provides means to overcome and address following problems and issues.

1. Allocating SPS resource per subframe as in LTE is inefficient in NR where scheduling is per slot. To maximize the scheduling efficiency, SPS resource needs to be allocated in slot basis. One problem is that the actual length of slot is different per SCS, while the length of SPS periodicity should be unambiguously determined by both UE and gNB. The invention provides a method and apparatus to allocate SPS resource per slot.

2. HARQ retransmission is another issue in SPS operation. Since the initial SPS transmission is performed without PDCCH/DCI (Downlink Control Information) where HARQ process id is indicated, UE and GNB need to associate the initial SPS transmission with a HARQ process. The invention provides a method and apparatus to associate HARQ process id and the initial SPS transmission based on which slot the initial SPS transmission takes place 3. It is important to minimize the false alarm rate for SPS command. SPS command is signaled by PDCCH protected by 16 bit CRC which provides fairly low false alarm rate in general. However, since a single SPS command has effect for long period of time, the false alarm rate shall be as low as possible. False alarm on SPS command may degrade the system performance far more significantly than false alarm on normal PDCCH. The invention provides a method and apparatus to minimize the false alarm rate. SPS command is SPS activation command or SPS release command.

4. The invention provides a method and apparatus to control the time domain distance between the PDCCH activating SPS resource and the PDSCH transmission on the first SPS resource (or the first configured assignment), and the time domain distance between PDSCH transmission on SPS resource and corresponding HARQ feedback. HARQ feedback is HARQ ACK or HARQ NACK.

The method of UE to address above issues is comprising of the following steps.

1: Receiving configuration information for configured grant in an RRC message; and 2: Determining the point of time when nth configured grant occurs based on the number of slots per frame, number of symbols per slot and symbol number of the first symbol where uplink transmission corresponding to the configured grant occurs; and 3: Determining the HARQ process id for a configured grant based on the number of slots per frame, number of symbols per slot, number of HARQ processes, the symbol number of the first symbol where uplink transmission corresponding to the configured grant occurs; and 4: Performing HARQ operation including initial transmission and retransmissions, wherein the configuration information for configured grant includes the periodicity in number of symbols, numerology for the configured grant and BWP for the configured grant. The number of slots per frame is determined by the SCS.

The method of a base station to address above issues is comprising of the following steps.

1: Transmitting configuration information for configured grant in an RRC message; and 2: Determining the point of time when $n^{th}$ configured grant occurs based on the number of slots per frame, number of symbols per slot and symbol number of the first symbol where uplink transmission corresponding to the configured grant occurs; and 3: Determining the HARQ process id for a configured grant based on the number of slots per frame, number of symbols per slot, number of HARQ processes, the symbol number of the first symbol where uplink transmission corresponding to the configured grant occurs; and 4: Performing HARQ operation including initial transmission and retransmissions, wherein the configuration information for configured grant includes the periodicity in number of symbols, numerology for the configured grant and BWP for the configured grant. The number of slots per frame is determined by the SCS.

Figure 11:
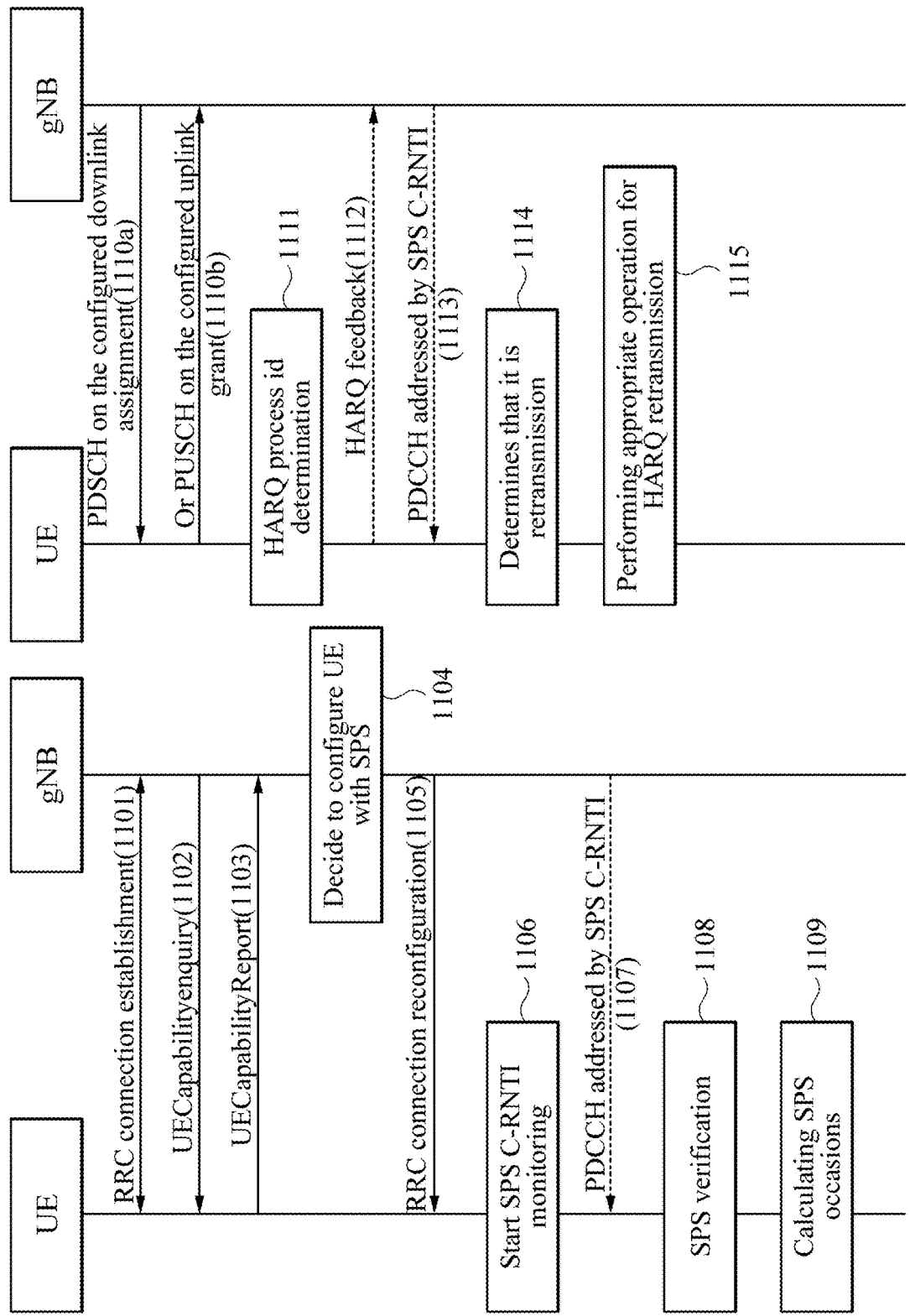
FIG. 11 is a signal flow diagram illustrating a procedure for transmitting and receiving signals at a UE and base station in a mobile communication system according to the 2nd embodiment of the present disclosure.

FIG. 11 is a signal flow diagram illustrating a procedure for transmitting and receiving signals at a UE and base station in a mobile communication system according to the $2^{nd}$ embodiment of the present disclosure.

UE and GNB establish the RRC connection wherein SRB 1 is established 1101.

GNB instructs UE to report its capability by sending UECapabilityEnquiry message 1102.

UE reports its capability by sending UECapabilityInformation message (UECapabilityReport) where UE's capability about SPS is included 1103. UE capability about SPS includes followings.

whether UE supports SPS the minimum SPS periodicity and the maximum SPS periodicity supported by the UE for downlink and for uplink the maximum number of HARQ processes that can be used for SPS for each direction the maximum number of DL SPS configurations that can be supported by UE simultaneously the maximum number of UL SPS configurations that can be supported by UE simultaneously Minimum K0 and minimum K1 supported by the UE. K0 is the time domain distance between PDCCH scheduling a downlink transmission and corresponding PDSCH. K1 is the time domain distance between (the starting position of) PDSCH and corresponding HARQ feedback. Both k0 and k1 are related to UE processing capability.

Supported numerologies

GNB decides to configure the UE with SPS to support e.g. VoIP traffic efficiently 1104. GNB determines SPS-configuration for the UE and makes an RRC connection reconfiguration message including SPS configuration GNB transmits and UE receives RRC connection reconfiguration message including SPS configuration 1105. The SPS configuration includes following information.

SPS C-RNTI which is used to activate or deactivate (release) SPS resource. A single SPS C-RNTI is used for both directions.

DL SPS configuration
- semiPersistSchedIntervalDL: SPS periodicity for downlink SPS. the value is enumerated, and each value represents a certain periodicity which can be either the number of slots, the number of symbols or the number of subframes. One example can be as shown below.
- semiPersistSchedIntervalDL ENUMERATED {symbol1, symbol2, symbol7, slot1, slot2, slot4, slot8, sf1, sf2, sf4, sf8, sf10, sf20, sf32, sf40, sf64, sf80, . . . }
- numberOfConfSPS-Processes: the number of DL HARQ processes that are assigned for DL SPS operation
- K0: the number of slots between PDCCH activating DL SPS resource (configured DL assignment) and the first DL SPS resource.
- K1: the number of slots between DL SPS initial transmission and the HARQ feedback for the initial DL SPS transmission. Alternatively, K1 can be signaled in the DCI that activating the DL SPS resource.
- numerology/SCS for DL SPS: The information regarding the numerology/SCS on which SPS is configured. This information can include numerology specific integer K
- SPS resource unit: whether configured assignment is per slot or per mini-slot (or number of symbols). It can be expressed as the length of the configured assignment in terms of number of symbols (14 symbols, 7 symbols or 2 symbols).
- DL BWP for DL SPS: BWP where DL SPS resource (configured assignment) will be configured. BWP (Bandwidth Part) is the frequency domain that PDCCH and PDSCH are transmitted. BWP is group of contiguous PRBs. Because a single numerology is applied to a single BWP, UE can deduce numerology/SCS for DL SPS from DL BWP, in which case numerology/SCS for DL SPS is not signaled.

UL SPS configuration
- semiPersistSchedIntervalUL: SPS periodicity for uplink SPS. the value is enumerated, each of value represent a certain periodicity which can be either the number of slots, the number of symbols or the number of subframes.
- numberOfConfSPS-Processes: the number of UL HARQ processes that are assigned for UL SPS operation
- N2: the number of symbols between PDCCH activating UL SPS resource and the first uplink SPS resource (or the first configured uplink grant)
- SPS resource unit: whether configured grant is per slot or per mini-slot (or number of symbols). It can be expressed as the length of the configured grant in terms of number of symbols (14 symbols, 7 symbols or 2 symbols).
- numerology/SCS for UL SPS: The information regarding the numerology/SCS on which SPS is configured. If this information is absent, same numerology and K as DL SPS are used.
- BWP for UL SPS: BWP where UL SPS resource (configured grant) will be configured UE start to monitor PDCCH/DCI addressed to SPS C-RNTI in the DL BWP configured for SPS 1106.

UE receives PDCCH/DCI addressed to SPS C-RNTI 1107.

UE determines whether the PDCCH/DCI activates/(re-)initializes SPS based on the information included in the DCI 1108.

If DCI is downlink assignment (e.g. DCI format 1), NDI is 0, HARQ process is set to 0, MSB of modulation and coding scheme is 0, K0 is 0, K1 is 0 and the redundancy version is 0, then downlink SPS is activated (configured assignment is initialized/activated). Alternatively, if K0 and K1 are not signaled in SPS-configuration, UE does not consider K0 and K1 in validating semi-persistent scheduling.

If DCI is uplink grant (e.g. DCI format 0), NDI is 0, N2 is 0, HARQ process is set to 0, TPC command is set to 0, redundancy version is 0 and MSB of the modulation and coding scheme is 0, then the uplink SPS is activated (configured grant is initialized/activated). Alternatively, if N2 is not signaled in SPS-configuration, UE does not consider N2 in validating semi-persistent scheduling.

If DCI is downlink assignment (e.g. DCI format 1), NDI is 0, HARQ process is set to 0, modulation and coding scheme is set to all 1 s, the redundancy version is 0, K0 is 0 (or set to all 1s), K1 is 0 (or set to all 1s) and the resource block assignment is set to all 1s, then downlink SPS is released/deactivated.

If DCI is uplink grant (e.g. DCI format 0), NDI is 0, HARQ process is set to 0, TPC command is set to 0 the modulation and coding scheme is set to all 1 s, redundancy version is set to 0, N2 is 0 (or set to all 1s) and resource assignment is set to all 1s, then the uplink SPS is released/deactivated.

UE initialize the configured assignment or configured grant 1109. UE calculates the SPS occasions as below;

If SCS is 15 KHz and the length of configured assignment/grant is 14 symbols (e.g. K=1, hereafter case 1), UE consider sequentially that Nth assignment/grant occurs in the subframe for which equation 4 is satisfied.

$$(10*SFN+subframe)=[(10*SFN_{start\ time}+subframe_{start\ time})+N*semiPersistSchedIntervalDL]\ modulo\ 10240 \quad (4)$$

Where $SFN_{start\ time}$ and $subframe_{start\ time}$ are the SFN and subframe, respectively, at the time the configured downlink assignment were (re-)initialised (e.g. k0 slots after the PDCCH (re-)initializing the downlink assignment were received) or at the time the configured uplink grant were (re-)initialised (e.g. N2 slots/symbols after the PDCCH (re-)initializing the uplink grant were received).

If SCS is not 15 KHz and the length of configured assignment/grant is either 7 symbols or 14 symbols (e.g. K=! 1, hereafter case 2) UE consider sequentially that Nth assignment/grant occurs in the slot for which equation 5 is satisfied.

$$(K*10*SFN+K*subframe+slot)=[(K*10*SFN_{start\ time}+K*subframe_{start\ time}+slot_{start\ time})+N*semiPersistSchedIntervalDL]\ modulo\ K*10240 \quad (5)$$

Where $SFN_{start\ time}$, $subframe_{start\ time}$ and $slot_{start\ time}$ are the SFN, subframe and slot, respectively, at the time the configured downlink assignment were (re-)initialised (e.g. k0 slots after the PDCCH (re-)initializing the downlink assignment were received) or at the time the configured uplink grant were (re-)initialised (e.g. N2 slots/symbols after the PDCCH (re-)initializing the uplink grant were received). K is an integer signaled by GNB or derived by UE based on the numerology associated with the SPS resource. K of each SCS is as below. The number of symbols per slot is configured per serving cell.

TABLE 2-1

| SCS | 15 KHz | 30 KHz | 60 KHz | 120 KHz | 240 KHz |
|---|---|---|---|---|---|
| K | 1 if 14 symbols per slot; 2 if 7 symbols per slot | 2 if 14 symbols per slot; 4 if 7 symbols per slot | 4 | 8 | 16 |

UE consider K is 1 if SCS is 15 KHz and the number of symbols per slot is 14 in the serving cell/BWP where SPS is configured.

UE consider K is 2 if SCS is 30 KHz and the number of symbols per slot is 14 or SCS is 15 KHz and the number of symbols per slot is 7 in the serving cell/BWP where SPS is configured.

UE consider K is 4 if SCS is 60 KHz and the number of symbols per slot is 14 or SCS is 35 KHz and the number of symbols per slot is 7 in the serving cell/BWP where SPS is configured.

If the length of configured assignment/grant is 2 symbols (e.g. configured assignment/grant is configured per mini-slot, hereafter case 3) UE consider sequentially that Nth assignment occurs in the subframe for which equation 6 is satisfied.

$$(K*H*10*SFN + K*H*\text{subframe} + H*\text{slot} + \text{symbol}) = [(K*H*10*SFN_{start\ time} + K*H*\text{subframe}_{start\ time} + H*\text{slot}_{start\ time} + \text{symbol}_{start\ time}) + N*\text{semiPersistSchedIntervalDL}] \bmod K*10240 \quad (6)$$

Where $SFN_{start\ time}$, $\text{subframe}_{start\ time}$, $\text{Slot}_{start\ time}$ and $\text{symbol}_{start\ time}$ are the SFN, subframe, slot and symobl respectively, at the time the configured downlink assignment were (re-)initialised (e.g. k0 slots after the PDCCH (re-)initializing the downlink assignment were received) or at the time the configured uplink grant were (re-)initialised (e.g. N2 slots/symbols after the PDCCH (re-)initializing the uplink grant were received).

H is the number of symbols per slot and either 7 or 14.

UE receives/transmits, at the time occasion calculated in 1109, the initial transmission for DL SPS or UL SPS, e.g. PDSCH or PUSCH, 1110(a,b).

UE determines the HARQ process for the initial transmission as below 1111.

Equation 7.

HARQ Process ID=[floor(CURRENT_TIME/semi-PersistSchedInterval)]modulo numberOfConf-SPS-Processes (7)

semiPersistSchedInterval is either semiPersistSchedIntervalDL or semiPersistSchedIntervalUL.

CURRENT_TIME can be selected according to current state of the SPS. CURRENT_TIME can be determined according to the cases explained above.

In case 1,

CURRENT_TIME=[(SFN*10)+subframe number]

In case 2,

CURRENT_TIME=[$K$*(SFN*10)+$K$*subframe number+slot number]

In case 3,

CURRENT_TIME=[$K$*$H$*(SFN*10)+$K$*$H$*subframe number+$H$*slot number+symbol number]

CURRENT_TIME denotes a value as table 2-2.

TABLE 2-2

| Downlink | The first subframe/slot/symbol where the transmission of the configured downlink assignment takes place/occurs |
|---|---|
| Uplink | The first subframe/slot/symbol where the transmission of the configured uplink grant takes place/occurs (or the first transmission of a bundle, or repeated transmission, takes place) |

If it is the DL SPS, UE decodes the received PDSCH and transmits HARQ feedback k1 slots after the corresponding configured downlink assignment 1112.

UE receives PDCCH/DCI addressed to SPS C-RNTI 1113. UE determines if the PDCCH/DCI indicates retransmission based on the NDI value 1114. If the NDI in the DCI is 1, it indicates retransmission.

UE performs appropriate operation for HARQ retransmission 1115. If it is retransmission for configured downlink assignment, UE combine the received data/transport block with the data/transport block in the soft buffer of associated HARQ process indicated in the received DCI. If is retransmission for configured uplink grant, UE performs the retransmission for the TB associated with the HARQ process id indicated in the received DCI.

Figure 12:
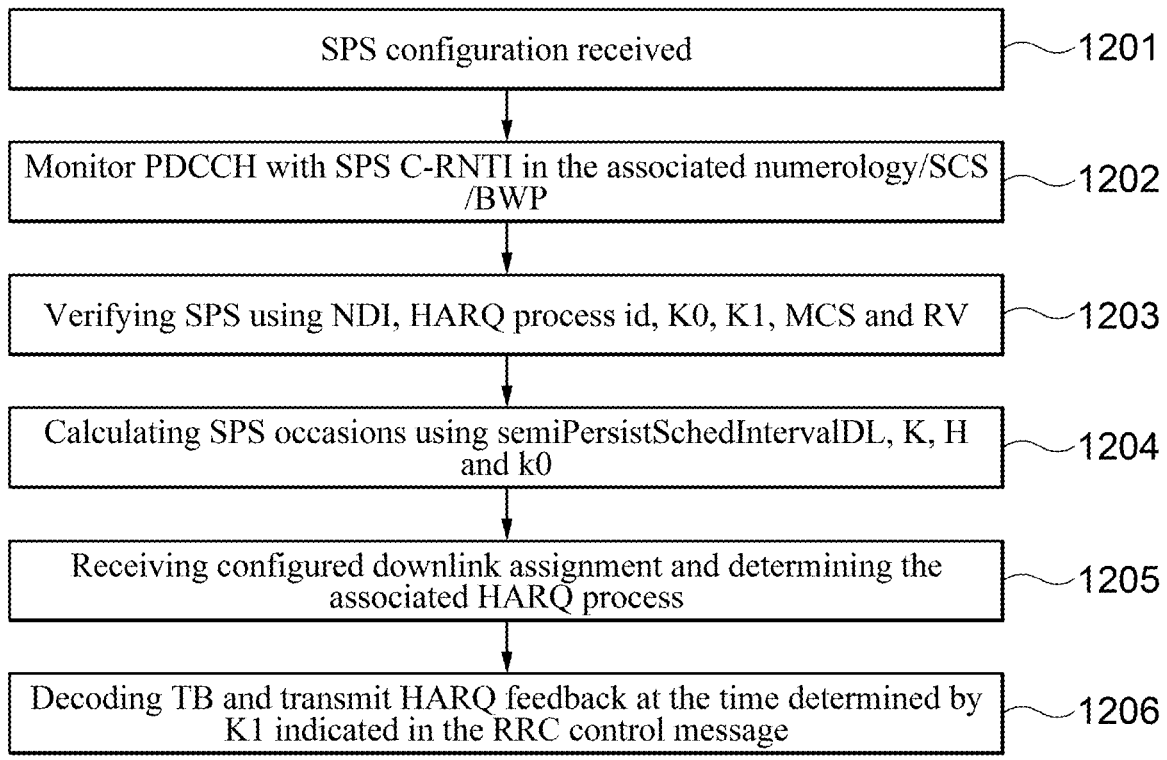
FIG. 12 is a flow chart illustrating UE operations for downlink SPS.

FIG. 12 is a flow chart illustrating UE operations for downlink SPS.

UE receives RRC control message including downlink SPS configuration information including SPS C-RNTI, k0, k1, semiPersistSchedIntervalDL, associated numerology/SCS and associated BWP 1201. semiPersistSchedIntervalDL is either the number of subframes, number of slots or number of symbols. The actual length of the SPS periodicity could be the function of the semiPersistSchedIntervalDL and associated numerology/SCS.

UE monitors PDCCH addressed to SPS C-RNTI in the BWP indicated in the RRC control message 1202.

UE verifies SPS (re-)initialization based on the certain fields in the received DCI 1203. The fields are NDI, HARQ process id, k0, k1, MSB of MCS and RV.

UE calculates SPS occasions based on the semiPersistSchedIntervalDL, K, H and k0 wherein K and H can be determined by UE based on the information in SPS-configuration 1204. K0 and K1 are signalled either in SPS configuration or in DCI activating DL SPS resource. UE uses K0 to determine when the first downlink SPS resource occurs and K1 to determine the first and subsequent HARQ feedback occasions (e.g. K1 affects multiple HARQ feedback occasions corresponding to multiple configured assignments).

UE receives TB according to the configured downlink assignment and determines the associated HARQ process using semiPersistSchedIntervalDL, numberOfConfSPS-Processes, K (or numerology/SCS), H (or number of symbols per slot) and the length of configured assignment 1205.

UE decodes the TB and transmit the HARQ feedback at the time determined by K1 signaled (or included or indicated) in the RRC control message 1206.

Figure 13:
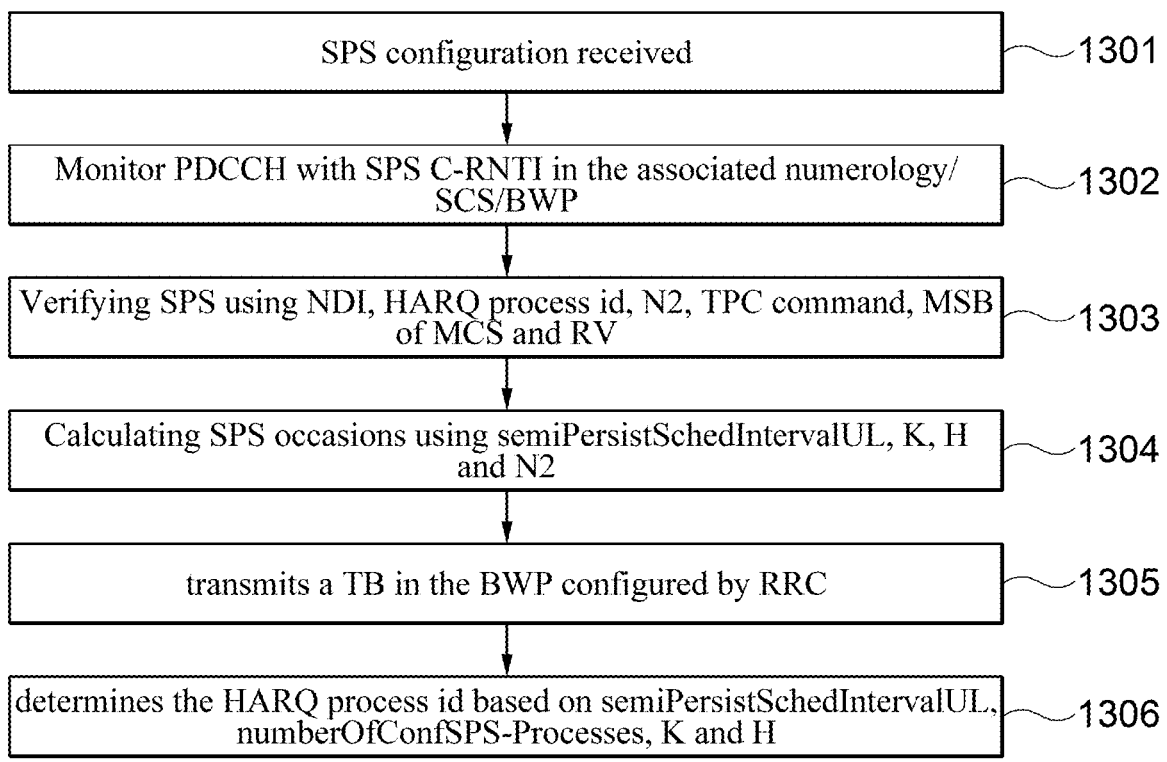
FIG. 13 is a flow chart illustrating UE operations for uplink SPS.

FIG. 13 is a flow chart illustrating UE operations for uplink SPS.

UE receives RRC control message including uplink SPS configuration information including SPS C-RNTI, N2, semiPersistSchedIntervalUL and associated numerology/SCS/BWP 1301. semiPersistSchedIntervalUL is either the number of subframes, number of slots or number of symbols.

The actual length of the SPS periodicity could be the function of the semiPersistSchedIntervalUL and associated numerology/SCS.

UE monitors PDCCH addressed to SPS C-RNTI 1302.

UE verifies SPS (re-)initialization based on the certain fields in the received DCI 1303. The fields are NDI, HARQ process id, N2, TPC command, MSB of MCS and RV.

UE calculates SPS occasions based on the semiPersistSchedIntervalUL, K, H and N2 wherein K and H are determined by UE based on the information in SPS configuration and number of the symbols per slot 1304. semiPersistSchedIntervalUL and N2 are indicated (or included) in the RRC control message. N2 is signalled either in UL SPS configuration or in DCI activating UL SPS resource. UE uses N2 to determine when the first uplink SPS resource occurs and K1 to determine the first and subsequent HARQ feedback occasions.

UE transmits a TB in BWP indicated by RRC control message 1305. UE determines the associated HARQ process using semiPersistSchedIntervalUL, numberOfConfSPSProcesses, K (or numerology/SCS), H (or number of symbols per slot) and other information 1306.

In this invention DL SPS resource and configured assignment are same. UL SPS resource and configured grants are same. "activate" and "initialize" are same. "deactivate" and "release" are same.

3$^{rd}$ Embodiment

Mobility is one of key functionalities in the mobile communication system. In this embodiment, methods and apparatus for performing various types of handover are provided.

The types of handover are categorized by when handover is executed and whether security changes or not.

TABLE 3-1

| HO Type | Immediate/delayed | Security update/no security update |
| --- | --- | --- |
| Type 1 | Immediate | Security update |
| Type 2 | Immediate | No security update |
| Type 3 | Delayed | Security update |
| Type 4 | Delayed | No security update |

Based on UE capability, cell layout, deployment scenario and operator's strategy, appropriate type of HO (handover) is executed. For example, if UE is moving between two cells connected with (or controlled by) the same GNB, the same security algorithm and the same security key can be used after HO. In such case type 2 or type 4 HO can be applied. If UE is moving in the region where many cells could possibly be the target cell, it would be beneficial if the HO message is given in advance before HO is really executed, and UE determines when and where to execute HO. In such case, type3 or type 4 HO can be applied.

In the normal situation where security is updated and HO is executed immediately, the state variable for RBs, of which data retransmission after HO is not required, is set to the initial value to make UE operation simple. It is also aligned with the conventional handover mechanism.

If it is the HO without security update, if state variable is initialized, the same sequence number with the same security key are applied to the different packets which violates the security principle.

If it is delayed HO, for downlink, UE does not know whether the received PDCP PDU is duplicated one or not if state variable is initialized.

Taking above aspects into account, this invention provides means to perform different set of behaviors depending on the types of HO.

The method of UE to address above issues is comprising of the following steps.

1: Receiving RRC reconfiguration message including the information relevant to PDCP operation and target cell information; and 2: Determining the PDCP operation to be performed based on the information included in the RRC reconfiguration message; and 3: Performing type 1 PDCP operation if the determined PDCP operation is type 1 PDCP operation and performing type 2 PDCP operation if the determined PDCP operation is type 2 PDCP operation, wherein in Type 1 PDCP operation, TX_NEXT, RX_NEXT and RX_DELIV of SRB and UM DRB are initialized to zero (or reset to the initial value) after receiving the RRC reconfiguration message; and TX_NEXT, RX_NEXT and RX_DELIV of AM DRB continue (or are not reset to the initial value) after receiving the RRC reconfiguration message; and wherein in type 2 PDCP operation, TX_NEXT, RX_NEXT and RX_DELIV of all types of RBs (SRB, UM DRB and AM DRB) continue (or not reset to the initial value) after receiving the RRC reconfiguration message; and wherein in type 1 PDCP operation, specific PDCP SDUs are processed to PDCP PDUs according to the PDCP configuration in the target cell and retransmitted in the target cell indicated in the RRC reconfiguration message; and wherein in type 2 PDCP operation, specific PDCP PDUs having been processed according to the PDCP configuration in the source cell are retransmitted in the target cell indicated in the RRC reconfiguration message.

The method of base station to address above issues is comprising of the following steps.

1: Determining the type of PDCP operation to be performed for a UE

2: Generating and transmitting an RRC reconfiguration message including the information relevant to the determined PDCP operation and target cell information;

wherein in Type 1 PDCP operation, TX_NEXT, RX_NEXT and RX_DELIV of SRB and UM DRB are initialized to zero (or reset to the initial value) after receiving the RRC reconfiguration message; and TX_NEXT, RX_NEXT and RX_DELIV of AM DRB continue after receiving the RRC reconfiguration message; and wherein in type 2 PDCP operation, TX_NEXT, RX_NEXT and RX_DELIV of SRB, UM DRB and AM DRB continue after receiving the RRC reconfiguration message; and wherein in type 1 PDCP operation, specific PDCP SDUs are processed to PDCP PDUs according to the PDCP configuration in the target cell and retransmitted to the target cell indicated in the RRC reconfiguration message; and wherein in type 2 PDCP operation, specific PDCP PDUs having been processed according to the PDCP configuration in the source cell are retransmitted to the target cell indicated in the RRC reconfiguration message.

Figure 14:
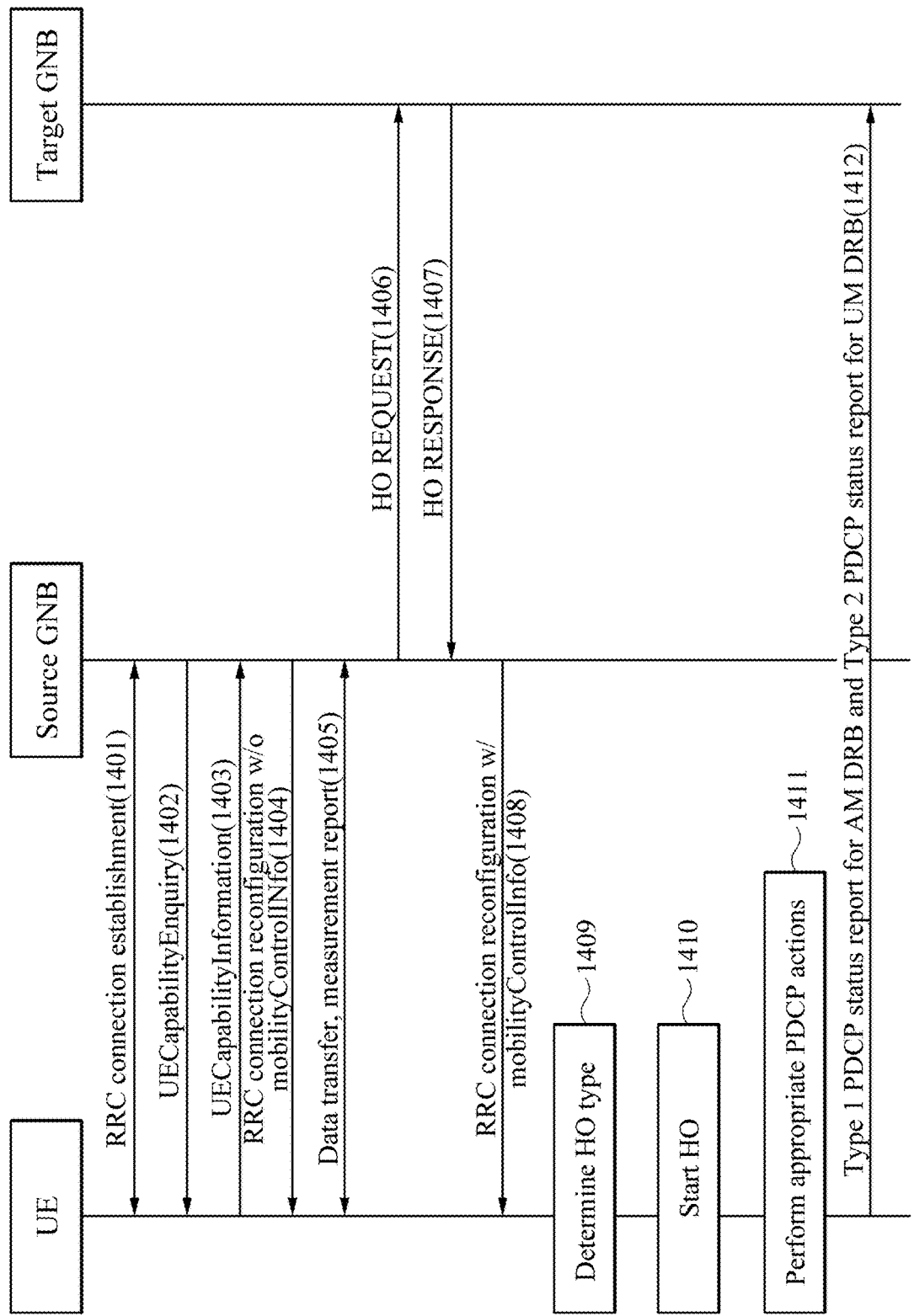
FIG. 14 is a signal flow diagram illustrating a procedure for transmitting and receiving signals at a UE and base station in a mobile communication system according to the $3^{rd}$ embodiment of the present disclosure.

FIG. 14 is a signal flow diagram illustrating a procedure for transmitting and receiving signals at a UE and base station in a mobile communication system according to the 3$^{rd}$ embodiment of the present disclosure.

UE and GNB establish the RRC connection wherein SRB 1 is established 1401.

GNB instructs UE to report its capability by sending UECapabilityEnquiry message 1402.

UE reports its capability by sending UECapabilityInformation message 1403. In the message UE reports the type of HO UE supports.

GNB decides to establish DRB s, which could be UM DRB or AM DRB 1404. GNB determines DRB configuration and sends RRCConnectionReconfiguration message without mobilityControlInfo. The message includes DRB configuration for one or more DRBs. DRB configuration information includes PDCP-config and RLC-config. PDCP-config include statusReportRequired.

For AM DRB, statusReportRequired is included if UE shall transmit type 1 PDCP status report for the DRB. For UM DRB, statusReportRequired is included if UE shall transmit type 2 PDCP status report for the DRB.

Type 1 PDCP status report includes both FMC (First Missing Count) and bitmap.

Type 2 PDCP status report includes FMC (First Missing Count) but does not include bitmap.

FMC is 32 bits and indicating the COUNT value of the first missing PDCP SDU in the Type 1 PDCP status report and indicating the COUNT value of the next expected PDCP SDU in the Type 2 PDCP status report.

Bitmap has variable length and the field indicates which SDUs are missing and which SDUs are correctly received.

The purpose of type 1 PDCP status report is to let target GNB know which PDCP SDU shall be retransmitted for the corresponding AM DRB.

The purpose of type 2 PDCP status report is to let target GNB know from which PDCP SDU the transmission shall start for the corresponding UM DRB.

The message also includes measurement configuration which indicate which frequency and which neighbor cell UE shall measure, and for which event UE shall trigger measurement report.

UE performs measurement and transmit or receive data using established DRB(s). UE reports measurement result if preconfigured condition is fulfilled 1405.

GNB decides to handover UE to a cell of a target GNB. Source GNB sends HANDOVER REQUEST to the target GNB for handover preparation 1406. HANDOVER REQUEST message includes following information; Requested HO type, measurement result relevant to the target cell, DRB configuration and required QoS associated with each DRB.

Target GNB performs call admission control and, if decide to accept the handover, makes mobilityContolInfo and send HANDOVER RESPONSE message including mobilityControlInfo to the source GNB 1407.

Source GNB compiles the RRCConnectionReconfiguration message including the mobilityControlInfo and send it to the UE 1408.

UE determines the types of HO based on the information included in the RRCConnectionReconfiguration message including the mobilityControlInfo 1409.

UE starts HO procedure at appropriate point of time based on the determined type of HO 1410.

UE performs appropriate PDCP operations based on the determined type of HO (e.g. if it is type 1 HO, perform PDCP operation for type 1 HO) 1411.

UE transmits PDCP STATUS report for the preconfigured AM DRBs and UM DRBs when HO is successfully completed 1412.

PDCP operation for type 1 HO (immediate HO with security update) is shown in table 3-2. Different operations are applied to SRB, UM DRB and AM DRB.

TABLE 3-2

|  | SRB | UM DRB | AM DRB |
| --- | --- | --- | --- |
| Tx state variable |  | set TX_NEXT to the initial value | use the current TX_NEXT |
| Rx state variable |  | set RX_NEXT and RX_DELIV to the initial value | use the current RX_NEXT and RX_DELIV |
| Handling of stored SDU/PDUs in Rx side when HO is started | discard all stored PDCP SDUs and PDCP PDUs | stop and reset t-Reordering; deliver all stored PDCP SDUs to the upper layers in ascending order of associated COUNT values after performing header decompression; | continue t-Reordering: perform header decompression on all stored PDCP PDUs in ascending order of associated COUNT values; |
| Security | apply the ciphering algorithm and key provided by upper layers | | |
| Header compression | N/A | reset the header compression protocol for downlink and start with NC state in U-mode; | |
| transmission after HO | N/A | for each PDCP SDU already associated with a PDCP SN but for which a corresponding PDU has not previously been submitted to lower layers: consider the PDCP SDUs as received from upper layer; perform transmission of the PDCP SDUs in ascending order of the COUNT value associated to the PDCP SDU without restarting the discardTimer. | from the first PDCP SDU for which the successful delivery of the corresponding PDCP PDU has not been confirmed by lower layers, perform retransmission or transmission of all the PDCP SDUs already associated with PDCP SNs in ascending order of the COUNT values associated to the PDCP SDU as specified below: perform header compression of the PDCP SDU; |

TABLE 3-2-continued

| SRB | UM DRB | AM DRB |
|---|---|---|
| | | perform integrity protection and ciphering of the PDCP SDU using the COUNT value associated with this PDCP SDU; submit the resulting PDCP Data PDU to lower layer. |

For transmission after type 1 HO, PDCP PDUs processed in the source/old cell are not transmitted or retransmitted, but PDCP SDUs are processed into the PDCP PDUs according to the new security and new header compression context and then retransmitted.

PDCP operation for type 2 HO (immediate HO without security update) is shown in table 3-3.

TABLE 3-3

| | SRB | UM DRB | AM DRB |
|---|---|---|---|
| Tx state variable | use the current TX_NEXT | | same as type 1 HO |
| Rx state variable | use the current RX_NEXT and RX_DELIV | | same as type 1 HO |
| Handling of stored SDU/PDUs in Rx side when HO is started | same as type 1 HO | same as type 1 HO | same as type 1 HO |
| Security | continue to use the ciphering algorithm and key used before HO | | |
| HC | N/A | same as type 1 HO | |
| transmission after HO | N/A | from the first PDCP PDU that has not been submitted to the lower, perform transmission in ascending order of the COUNT values associated to the PDCP PDU; from the first PDCP SDU that has not been processed to PDCP PDU, processing them to PDCP PDU and peform transmission in ascending order of the COUNT value associated to the PDCP SDU. discardTimer is not restarted. | perform retransmission of all the PDCP PDUs previously submitted to re-established AM RLC entity (before HO) in ascending order of the associated COUNT values from the first PDCP PDU for which the successful delivery has not been confirmed by lower layers. discardTimer is not restarted. |

For transmission after type 2 HO, PDCP PDUs processed in the source/old cell are transmitted or retransmitted as they are. Only the PDCP SDUs having not been processed into PDCP PDUs are processed into the PDCP PDUs before transmission. In type 2 HO, state variables are not reset to the initial value but the current state variables are continuously used after HO for SRBs and for UM DRBs to avoid the situation where the same sequence number and the same security key are applied to different packets.

PDCP operation for type 3 HO (delayed HO with security update) is shown in table 3-4.

TABLE 3-4

| | SRB | UM DRB | AM DRB |
|---|---|---|---|
| Tx state variable | same as type 1 HO (to the initial value) | same as type 1 HO (to the initial value) | same as type 1 HO (current value) |
| Rx state variable | same as type 1 HO (to the initial value) | same as type 2 HO (current value) | same as type 1 HO (current value) |

TABLE 3-4-continued

| | SRB | UM DRB | AM DRB |
|---|---|---|---|
| Handling of stored SDU/PDUs in Rx side when HO is started | same as type 1 HO | same as type 1 HO | same as type 1 HO |
| Security | | same as type 1 HO | |
| HC | N/A | same as type 1 HO | same as type 1 HO |
| transmission after HO | N/A | same as type 1 HO (PDCP SDU transmission) | same as type 1 HO (PDCP SDU retransmission) |

In type 3 HO if state variables reset, target GNB does not know from which PDCP SDU it shall start transmission, and UE does not know which received PDCP PDU is duplicate reception. To overcome the problem, Rx state variable in UE side are not reset to the initial value but the current state variables are continuously used after type 3 HO for UM DRBs. UE reset Tx state variable because there is no such issue in uplink direction. On the other hands, GNB keeps the current Tx state variable but reset Rx state variable to the initial value.

PDCP operation for type 4 HO (delayed HO without security update) is shown in table 3-5.

TABLE 3-5

|  | SRB | UM DRB | AM DRB |
|---|---|---|---|
| Tx state variable | same as type 2 HO (current value) | same as type 2 HO (current value) | same as type 1 HO |
| Rx state variable | same as type 2 HO (current value) | same as type 2 HO (current value) | same as type 1 HO |
| Handling of stored SDU/PDUs in Rx side when HO is started | same as type 1 HO | same as type 1 HO | same as type 1 HO |
| Security |  | same as type 2 HO |  |
| HC | N/A | same as type 1 HO | same as type 1 HO |
| transmission after HO | N/A | Same as type 2 HO (PDCP PDU transmission) | Same as type 2 HO (PDCP PDU retransmission) |

In type 4 HO, state variables are kept to the current values in both directions, in both Tx state variables and Rx state variables and in all type of RBs. Data transmission and retransmission after HO is based on PDCP PDU if already processed in the old cell (or before PDCP re-establishment).

Figure 15:
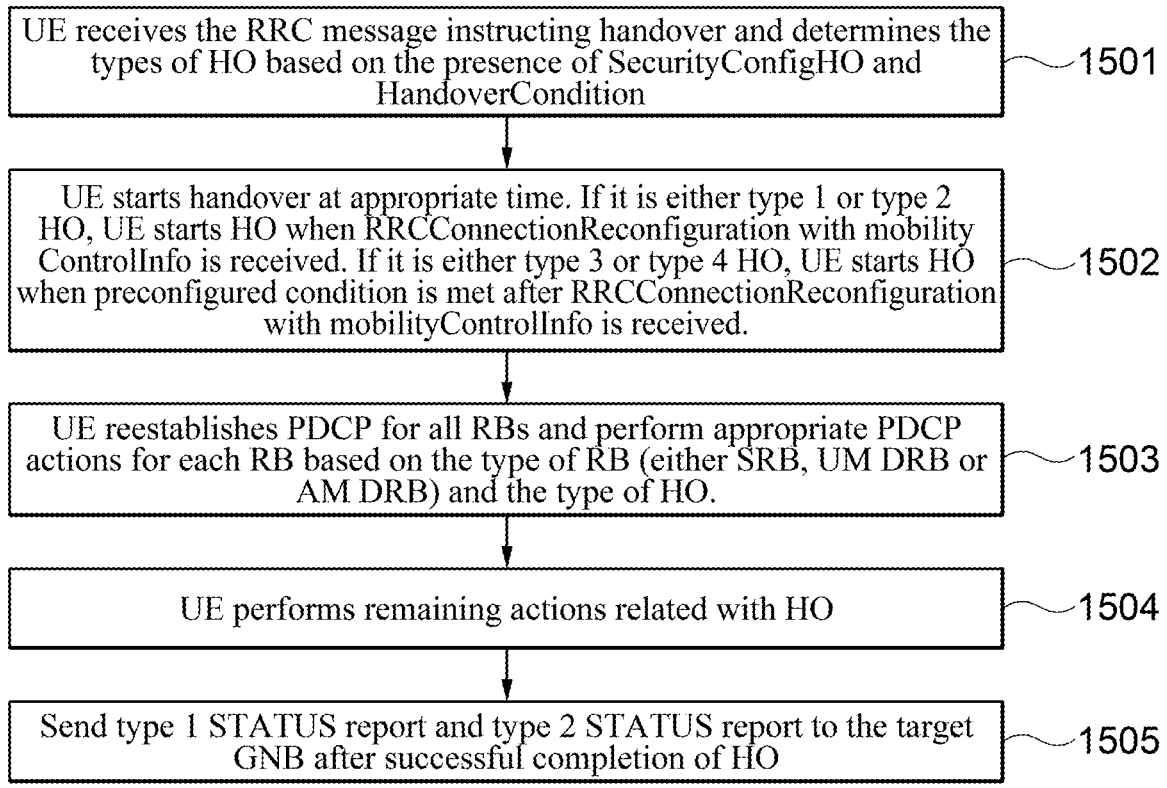
FIG. 15 is a flow chart illustrating UE operations.

FIG. 15 is a flow chart illustrating UE operations.

UE receives the RRC message instructing handover (e.g. RRCConnectionReconfiguration message including mobilityControlInfo) 1501. Based on the information included in the RRCConnectionReconfiguration, UE determines the type of HO as followings.

Type 1 HO: securityConfigHO is included but HandoverCondition is not included in RRCConnectionReconfiguration message including mobilityControlInfo Type 2 HO: neither securityConfigHO nor HandoverCondition are included in RRCConnectionReconfiguration message including mobilityControlInfo Type 3 HO: Both securityConfigHO and HandoverCondition are included in RRCConnectionReconfiguration message including mobilityControlInfo Type 4 HO: securityConfigHO is not included but HandoverCondition are included in RRCConnectionReconfiguration message including mobilityControlInfo securityConfigHO includes securityAlgorithmConfig (indicating the new security algorithm) and security key related information like input for deriving the new security key or simple indication that new security shall be applied.

HandoverCondition includes information about the condition that handover shall start. The condition could be for example if one of candidate target cell's quality is better than the serving cell. Alternatively, HandoverCondition could be just a single indicator whether delayed HO is applied or not UE starts handover at appropriate time 1502. If it is either type 1 or type 2 HO, UE starts HO when RRCConnectionReconfiguration with mobilityControlInfo is received. When HO starts, UE start synchronizing to the DL of the target PCell which is indicated by mobilityControlInfo and reset MAC.

If it is either type 3 or type 4 HO, UE starts HO when preconfigured condition is met after RRCConnectionReconfiguration with mobilityControlInfo is received.

UE reestablishes PDCP for all RBs and perform appropriate PDCP operations for each RB based on the type of RB (either SRB, UM DRB or AM DRB) and the type of HO 1503.

UE performs remaining actions related with HO 1504. The actions include reestablishing RLC for all RBs, triggering random access procedure in the target cell and transmitting RRCConnectionReconfigurationComplete message in the target cell.

UE consider the handover is successful when random access procedure completes successfully in the target cell, and compile type 1 PDCP status report and type 2 PDCP status report and send them to the target GNB 1505.

UE sends type 1 PDCP status report for the AM DRBs for which statusReportRequired is configured.

UE sends type 2 PDCP status report for the UM DRBs for which statusReportRequired is configured if the handover is either type 3 HO or type 4 HO.

Figure 16:
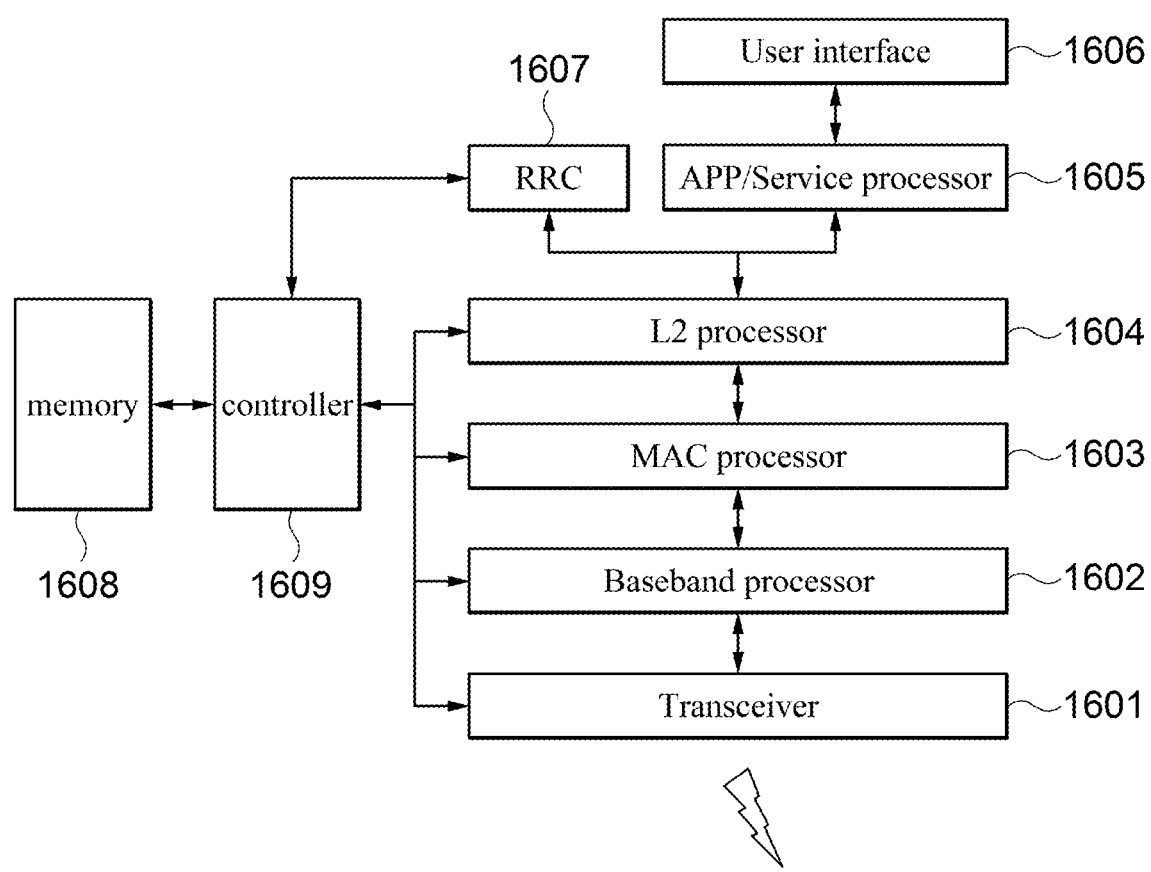
FIG. 16 is a block diagram illustrating a configuration of a terminal according to various embodiments of the present disclosure.

FIG. 16 is a block diagram illustrating a configuration of a terminal according to various embodiments of the present disclosure.

UE consists of transceiver 1601, baseband processor 1602, MAC processer 1603, Layer 2 processor 1604, Application/service processor 1605, user interface 1606, RRC processor 1607, memory 1608 and controller 1609.

Transceiver process the signal received from baseband processor for transmission or process the received signal to send it to baseband processor.

Baseband processor process (e.g. scrambling, channel coding, modulation etc) bit stream received from MAC processor to send it to transceiver or process the received the signal from the transceiver to send it to MAC processor.

MAC processor multiplex RLC PDUs from L2 processor into MAC PDU or demultiplex MAC PDU to RLC PDUs to forward them to L2 processor. It forward MAC control element to controller or multiplex MAC control element into MAC PDU.

L2 processor consists of RLC processor and PDCP processor. L2 processor process RRC message from RRC processor into RLC PDU and process IP packet from application/service processor into RLC PDU, or vice versa.

Application/service processor processes the input from user interface and generate and forward IP packets to L2 processor for transmission. Application/service processor processes IP packets received from L2 processor and forward necessary input to user interface.

User interface consist of display, virtual key board, speaker and microphone and interact with user.

Memory stores necessary information forwarded from the controller and deliver necessary information to controller based on controller's instruction.

Controller controls the mobile communication in general. UE behavior/operation depicted in the FIGS. 5, 6, 7, 8, 11, 12, 13, 14 and 15 are controlled by controller.

Figure 17:
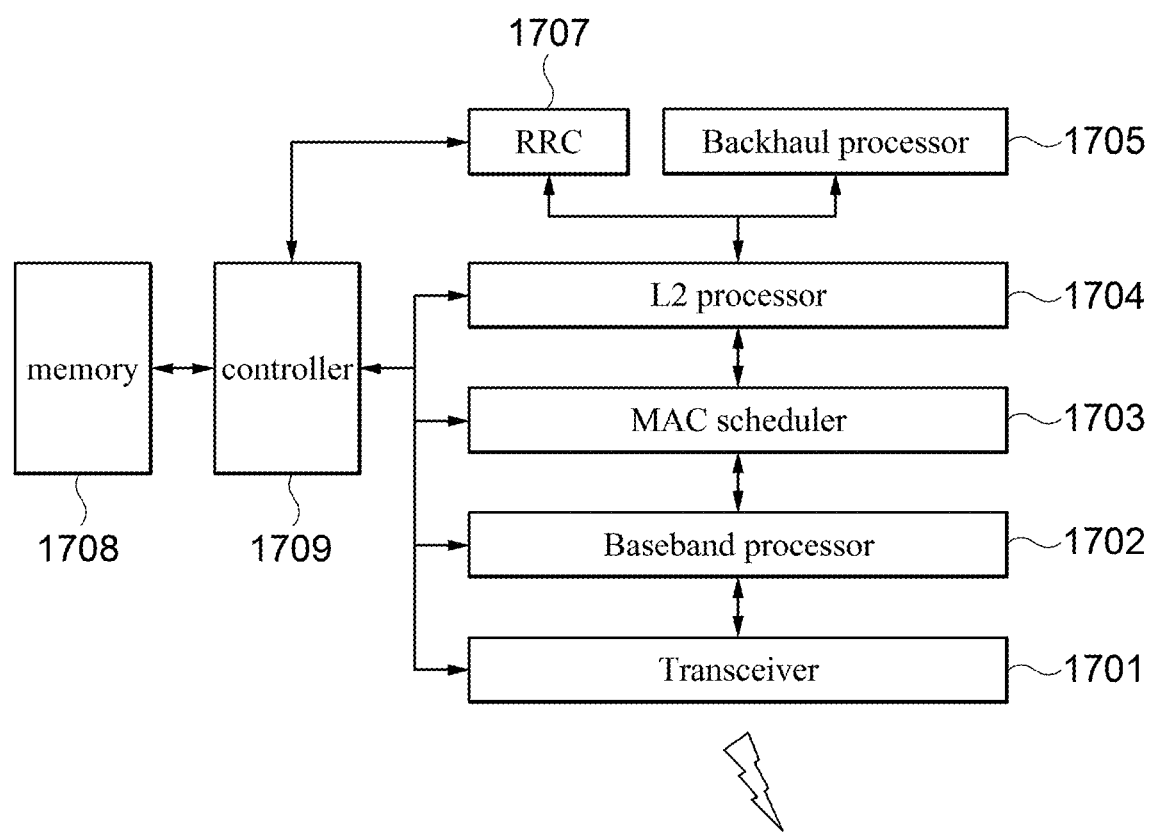
FIG. 17 is a block diagram illustrating a configuration of a base station according to various embodiments of the present disclosure.

FIG. 17 is a block diagram illustrating a configuration of a base station according to various embodiments of the present disclosure.

Node B consists of transceiver 1701, baseband processor 1702 MAC processor/scheduler 1703, Layer 2 processor 1704, backhaul processor 1705, RRC processor 1707, memory 1708 and controller 1709.

Transceiver process the signal received from baseband processor for transmission or process the received signal to send it to baseband processor.

Baseband processor process (e.g. scrambling, channel coding, modulation etc) bit stream received from MAC processor to send it to transceiver or process the received the signal from the transceiver to send it to MAC processor.

MAC processor multiplex RLC PDUs from L2 processor into MAC PDU or demultiplex MAC PDU to RLC PDUs to forward them to L2 processor. It forward MAC control element to controller or multiplex MAC control element into MAC PDU.

Scheduler allocate resource to UEs in the cells controlled by the scheduler.

L2 processor consists of RLC processor and PDCP processor. L2 processor process RRC message from RRC processor into RLC PDU and process IP packet from backhaul processor into RLC PDU, or vice versa.

Backhaul processor communicate with core network node.

Memory stores necessary information forwarded from the controller and deliver necessary information to controller based on controller's instruction.

Controller controls the mobile communication in general. Node B behavior/operation depicted or implied in the FIGS. 5, 6, 7, 8, 11, 12, 13, 14 and 15 are controlled by controller.

Meanwhile, the method and apparatus to receive and transmit data in a mobile communication system according to various exemplary embodiments of the present invention described above may be implemented in an installation data form and be provided in servers or devices in a state in which it is stored in various non-transitory computer readable media. Therefore, the respective apparatuses may access the servers or the devices in which the installation data are stored to download the installation data.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

Abbreviation

AM DRB Acknowledged Mode Data Radio Bearer
ARFCN Absolute Radio Frequency Channel Number
BWP Bandwidth Part
C-RNTI Cell Radio Network Temporary Identifier
DL Downlink
DRX Discontinuous Reception
E-UTRAN Evolved Universal Terrestrial Radio Access Network
FMC First Missing Count
GNB next Generation Node B
HARQ Hybrid Automatic Retransmission reQuest
HO Handover
MAC Medium Access Control
MAC CE MAC Control Element
MeNB Master eNode B
MIB Master Information Block
MME Mobility Management Entity
MSB Most Significant Bit
NR Next Radio
PDCCH Physical Downlink Control Channel
PDCP Packet Data Convergence Protocol
PDSCH Physical Downlink Shared Channel
PDU Protocol Data Unit
PRB Physical Resource Block
PCell Primary Cell
PUSCH Physical Uplink Shared Channel
RAT Radio Access Technology
RB Radio Bearer
RLC Radio Link Control
RLF Radio Link Failure
RRC Radio Resource Control
RTT Round Trip Time
RV Redundancy Version
SCells Secondary Cells
SCS Sub Carrier Spacing
SDAP Service Data Adaptation Protocol
SDU Service Data Unit
SFN System Frame Number
SgNB Secondary gNode B
SPS Semi-Persistent Scheduling
SRB Signaling Radio Bearer
TTI Transmission Time Interval
UE User Equipment; interchangeable with Terminal
UL Uplink
UM DRB Unacknowledged Mode Data Radio Bearer

What is claimed is:

1. A method by a terminal, the method comprising:
reporting supported SCS(Sub Carrier Spacing)s per frequency band to a base station;
receiving DRX (Discontinuous Reception) configuration in a RRC(Radio Resource Control) message from the base station;
determining a subframe to start onDurationTimer based on $1^{st}$ DRX parameter and $2^{nd}$ DRX parameter;
determining a point of time within the determined subframe based on $3^{rd}$ DRX parameter;
starting the onDurationTimer at the determined point of time of the determined subframe;
starting drx-RetransmissionTimer after downlink assignment is received; and
starting drx-ULRetransmissionTimer after uplink assignment is received, wherein the onDurationTimer, the 1$^{st}$ DRX parameter, the 2$^{nd}$ DRX parameter, the 3$^{rd}$ DRX parameter, the drx-RetransmissionTimer and the drx-ULRetransmission-Timer are signaled by a single RRC message, wherein length of the onDurationTimer is determined by a value configured for the onDurationTimer, wherein length of the drx-RetransmissionTimer is determined by a value configured for the drx-RetransmissionTimer and the SCS, wherein length of the drx-ULRetransmissionTimer is determined by a value configured for the drx-ULRetransmissionTimer and the SCS.

2. The method of claim 1, further comprising:
stopping the drx-ULRetransmissionTimer and starting HARQ (Hybrid automatic repeat reques) RTT (Round Trip Time) timer at different points of time.

3. The method of claim 1, further comprising:
stopping the drx-RetransmissionTimer and starting HARQ RTT timer at the same point of time.

4. The method of claim 1, further comprising:
starting the drx-RetransmissionTimer when HARQ RTT timer expires.

5. The method of claim 4, further comprising:
expiring HARQ RTT timer after, since a downlink assignment is received for a 2$^{nd}$ cell, a specific number of symbols of a 1$^{st}$ cell and another specific number of symbols of the 2$^{nd}$ cell.

6. A method by a base station, the method comprising:
receiving supported SCS(Sub Carrier Spacing)s per frequency band from a UE (User Equipment);
determining DRX (Discontinuous Reception) configuration for the UE;
transmitting to the UE a RRC(Radio Resource Control) message carrying DRX configuration;
determining a subframe to start onDurationTimer based on 1$^{st}$ DRX parameter and 2$^{nd}$ parameter;
determining a point of time within the determined subframe based on 3$^{rd}$ DRX parameter;
starting the onDurationTimer at the determined point of time of the determined subframe;
starting drx-RetransmissionTimer after downlink assignment is scheduled; and
starting drx-ULRetransmissionTimer after uplink assignment is scheduled,
wherein the onDurationTimer, the 1$^{st}$ DRX parameter, the 2$^{nd}$ DRX parameter, 3$^{rd}$ DRX parameter, the drx-RetransmissionTimer and the drx-ULRetransmission-Timer are signaled by a single RRC message,
wherein length of the onDurationTimer is determined by a value configured for the onDurationTimer,
wherein the length of the drx-RetransmissionTimer is determined by a value configured for the drx-RetransmissionTimer and the SCS,
wherein the length of the drx-ULRetransmissionTimer is determined by a value configured for the drx-ULRetransmissionTimer and the SCS.

7. The method of claim 6, further comprising:
stopping the drx-ULRetransmissionTimer and starting HARQ (Hybrid automatic repeat reques) RTT (Round Trip Time) timer at different points of time.

8. The method of claim 6, further comprising:
stopping the drx-RetransmissionTimer and starting HARQ RTT timer at the same point of time.

9. The method of claim 6, further comprising:
starting the drx-RetransmissionTimer when HARQ RTT timer expires.

10. The method of claim 9, further comprising:
HARQ RTT timer expires after, since a downlink assignment is scheduled for a 2$^{nd}$ cell, a specific number of symbols of a 1$^{st}$ cell and another specific number of symbols of the 2$^{nd}$ cell.

11. A terminal in a wireless communication system, the terminal comprising:
a transceiver configured to transmit and receive a signal; and
a controller configured to control the transceiver to:
report supported SCS(Sub Carrier Spacing)s per frequency band to a base station;
receive DRX (Discontinuous Reception) configuration in a RRC(Radio Resource Control) message from the base station;
determine a subframe to start onDurationTimer based on 1$^{st}$ DRX parameter and 2$^{nd}$ DRX parameter;
determine a point of time within the determined subframe based on 3$^{rd}$ DRX parameter;
start the onDurationTimer at the determined point of time of the determined subframe;
start drx-RetransmissionTimer after downlink assignment is received; and
start drx-ULRetransmissionTimer after uplink assignment is received,
wherein the onDurationTimer, the 1$^{st}$ DRX parameter, the 2$^{nd}$ DRX parameter, the 3$^{rd}$ DRX parameter, the drx-RetransmissionTimer and the drx-ULRetransmission-Timer are signaled by a single RRC message,
wherein length of the onDurationTimer is determined by a value configured for the onDurationTimer,
wherein length of the drx-RetransmissionTimer is determined by a value configured for the drx-RetransmissionTimer and the SCS,
wherein length of the drx-ULRetransmissionTimer is determined by a value configured for the drx-ULRetransmissionTimer and the SCS.

12. The terminal of claim 11,
wherein the controller is further configured to stop the drx-ULRetransmissionTimer and to start HARQ (Hybrid automatic repeat reques) RTT (Round Trip Time) timer at different points of time.

13. The terminal of claim 11,
wherein the controller is further configured to stop the drx-RetransmissionTimer and to start HARQ RTT timer at the same point of time.

14. The terminal of claim 11,
wherein the controller is further configured to start the drx-RetransmissionTimer when HARQ RTT timer expires.

15. The terminal of claim 14,
wherein the controller is further configured to expire HARQ RTT timer after, since a downlink assignment is received for a 2$^{nd}$ cell, a specific number of symbols of a 1$^{st}$ cell and another specific number of symbols of the 2$^{nd}$ cell.

16. A base station apparatus for controlling uplink transmission timing, the base station apparatus comprising:
a transceiver configured to transmit and receive a signal; and
a controller configured to control the transceiver to:
receive supported SCS(Sub Carrier Spacing)s per frequency band from a UE (User Equipment);
determine DRX (Discontinuous Reception) configuration for the UE;
transmit to the UE a RRC(Radio Resource Control) message carrying DRX configuration;

determine a subframe to start onDurationTimer based on 1$^{st}$ DRX parameter and 2$^{nd}$ DRX parameter;
determine a point of time within the determined subframe based on 3$^{rd}$ DRX parameter;
start the onDurationTimer at the determined point of time of the determined subframe;
start drx-RetransmissionTimer after downlink assignment is scheduled; and
start drx-ULRetransmissionTimer after uplink assignment is scheduled,
wherein the onDurationTimer, the 1$^{st}$ DRX parameter, the 2$^{nd}$ DRX parameter, the 3$^{rd}$ DRX parameter, the drx-RetransmissionTimer and the drx-ULRetransmissionTimer are signaled by a single RRC message,
wherein length of the onDurationTimer is determined by a value configured for the onDurationTimer,
wherein length of the drx-RetransmissionTimer is determined by a value configured for the drx-RetransmissionTimer and the SCS,
wherein length of the drx-ULRetransmissionTimer is determined by the value configured for the drx-ULRetransmissionTimer and the SCS.

17. The bases station of claim 16, wherein the controller is further configured to stop the drx-ULRetransmissionTimer and to start HARQ (Hybrid automatic repeat reques) RTT (Round Trip Time) timer at different points of time.

18. The bases station of claim 16, wherein the controller is further configured to stop the drx-RetransmissionTimer and starting HARQ RTT timer at the same point of time.

19. The bases station of claim 16, wherein the controller is further configured to start the drx-RetransmissionTimer when HARQ RTT timer expires.

20. The bases station of claim 16, wherein the controller is further configured to expire HARQ RTT timer after, since a downlink assignment is received for a 2$^{nd}$ cell, a specific number of symbols of a 1$^{st}$ cell and another specific number of symbols of the 2$^{nd}$ cell.

* * * * *